(12) United States Patent
Ruiz Coll et al.

(10) Patent No.: US 12,445,599 B2
(45) Date of Patent: Oct. 14, 2025

(54) BLOCK VECTOR PREDICTOR CANDIDATE SELECTION

(71) Applicant: Comcast Cable Communications, LLC, Philadelphia, PA (US)

(72) Inventors: Damian Ruiz Coll, Reston, VA (US); Vikas Warudkar, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/351,297

(22) Filed: Jul. 12, 2023

(65) Prior Publication Data

US 2024/0031557 A1 Jan. 25, 2024

Related U.S. Application Data

(60) Provisional application No. 63/388,552, filed on Jul. 12, 2022.

(51) Int. Cl.
*H04N 11/02* (2006.01)
*H04N 19/105* (2014.01)
*H04N 19/136* (2014.01)
*H04N 19/176* (2014.01)

(52) U.S. Cl.
CPC ......... *H04N 19/105* (2014.11); *H04N 19/136* (2014.11); *H04N 19/176* (2014.11)

(58) Field of Classification Search
CPC .................................................. H04N 19/105
USPC ....................................... 375/240.01–240.29
See application file for complete search history.

(56) References Cited

U.S. PATENT DOCUMENTS

| 10,448,026 | B1* | 10/2019 | Xu .................. | H04N 19/105 |
| 2005/0053137 | A1* | 3/2005 | Holcomb ............ | H04N 19/463 |
| | | | | 375/E7.138 |
| 2006/0083440 | A1* | 4/2006 | Chen ................ | H04N 23/698 |
| | | | | 382/284 |
| 2006/0245497 | A1* | 11/2006 | Tourapis ............ | H04N 19/56 |
| | | | | 375/E7.107 |
| 2011/0194609 | A1* | 8/2011 | Rusert .............. | H04N 19/176 |
| | | | | 375/E7.243 |
| 2012/0275522 | A1* | 11/2012 | Kim ................. | H04N 19/567 |
| | | | | 375/E7.243 |
| 2013/0208799 | A1* | 8/2013 | Srinivasamurthy .. | H04N 19/122 |
| | | | | 375/240.12 |
| 2015/0189272 | A1* | 7/2015 | Peng ................ | H04N 19/119 |
| | | | | 375/240.02 |

(Continued)

OTHER PUBLICATIONS

Cuiling Lan, Jizheng Xu, Feng Wu and Guangming Shi, "Intra Frame Coding With Template Matching Prediction and Adaptive Transform", Proceedings of 2010 IEEE 17th International Conference on Image Processing Sep. 26-29, 2010, Hong Kong.

(Continued)

*Primary Examiner* — Leron Beck
(74) *Attorney, Agent, or Firm* — Banner & Witcoff, Ltd.

(57) ABSTRACT

Encoding and/or decoding a block of a video frame may be based on a previously decoded reference block in the same frame or in a different frame. The reference block may be indicated by a block vector (BV). The BV may be encoded as difference between a block vector predictor (BVP) and the BV. The BVP may be selected based on a distance between the BVP and another BVP which may improve diversity of selected BVPs and improve prediction accuracy of the BVP.

20 Claims, 22 Drawing Sheets

(56) References Cited

U.S. PATENT DOCUMENTS

| | | | | | |
|---|---|---|---|---|---|
| 2015/0264396 | A1* | 9/2015 | Zhang | ............... | H04N 19/593 |
| | | | | | 375/240.16 |
| 2016/0100189 | A1* | 4/2016 | Pang | ............... | H04N 19/44 |
| | | | | | 375/240.13 |
| 2017/0054996 | A1* | 2/2017 | Xu | ............... | H04N 19/593 |
| 2017/0155914 | A1* | 6/2017 | Jeon | ............... | H04N 19/52 |
| 2018/0014011 | A1* | 1/2018 | He | ............... | H04N 19/593 |
| 2018/0146208 | A1* | 5/2018 | Hojati | ............... | H04N 19/96 |
| 2019/0246113 | A1* | 8/2019 | Xu | ............... | H04N 19/44 |
| 2020/0021842 | A1* | 1/2020 | Leontaris | ............... | H04N 19/527 |
| 2020/0053379 | A1* | 2/2020 | Han | ............... | H04N 19/593 |
| 2020/0068218 | A1* | 2/2020 | Chen | ............... | H04N 19/82 |
| 2020/0260119 | A1* | 8/2020 | Esenlik | ............... | H04N 19/70 |

OTHER PUBLICATIONS

V. Sze et al. (eds.), High Efficiency Video Coding (HEVC): Algorithms and Architectures, Integrated Circuits and Systems, DOI 10.1007/978-3-319-06895-4_1, © Springer International Publishing Switzerland 2014.

M. Wien, High Efficiency Video Coding, Signals and Communication Technology, DOI 10.1007/978-3-662-44276-0_1, © Springer-Verlag Berlin Heidelberg 2015.

JVET-Y0058, Joint Video Experts Team (JVET) of ITU-T SG 16 WP 3 and ISO/IEC JTC 1/SC 29 25th Meeting, by teleconference, Jan. 12-21, 2022, Source: Bytedance Inc., Title: EE2-3.13: Modifications of IBC Merge/AMVP List Construction.

JVET-Y0088-v1, Joint Video Experts Team (JVET) of ITU-T SG 16 WP 3 and ISO/IEC JTC 1/SC 29 25th Meeting, by teleconference, Jan. 12-21, 2022, Source: InterDigital, Title: EE2-related: IBC with Template Matching.

JVET-Z0066-v2, Joint Video Experts Team (JVET) of ITU-T SG 16 WP 3 and ISO/IEC JTC 1/SC 29 26th Meeting, by teleconference, Apr. 20-29, 2022, Source: Wilus Inc., Title: EE2-related: Template matching using extended MVP candidate list.

JVET-Z0084-v1, Joint Video Experts Team (JVET) of ItTU-T SG 16 WP 3 and ISO/IEC JTC 1/SC 29 26th Meeting, by teleconference, Apr. 20-29, 2022, Source: InterDigital, Title: EE2-3.4: IBC with Template Matching.

JVET-Z2025, Joint Video Experts Team (JVET) of ITU-T SG 16 WP 3 and ISO/IEC JTC 1/SC 29 26th Meeting, by teleconference, Apr. 20-29, 2022, Source: Editors, Title: Algorithm description of Enhanced Compression Model 5 (ECM 5).

JVET-Z1000-v1, Joint Video Experts Team (JVET) of ITU-T SG 16 WP 3 and ISO/IEC JTC 1/SC 29 26th Meeting, by teleconference, Apr. 20-29, 2022, Source: Chair of JVET, Title: Meeting Report of the 26th Meeting of the JVET.

Yujin Lee et al., "Study of Sub-pel Block Vector for Intra Block Copy", Dept. of Electrical and Computer Engineering, Sungkyunkwan University, Korea, 2022.

Yoonjeong Shin et al., "Low Complexity Heterogenous Video Transcoding by Motion Vector Clustering", 2010, IEEE.

JVET-AC0060-v2, Joint Video Experts Team (JVET) of ITU-T SG 16 WP 3 and ISO/IEC JTC 1/SC 29, 29th Meeting, by teleconference, Jan. 11-20, 2023, Source: Ofinno, LLC, Title: EE2-3.4: BVP candidates clustering and BVD sign deriation for Reconstruction—Reordered IBC mode.

Nov. 9, 2023—European Search Report—EP App. No. 23185076.9.

* cited by examiner

The quick brown fox jumps over the lazy dog. The quick brown fox jumps over the lazy dog. The quick brown fox jumps over the lazy dog.

*FIG. 16*

|  | All Intra Main 10 | | | | |
|---|---|---|---|---|---|
|  | Over ECM-5.0 | | | | |
|  | Y | U | V | EncT | DecT |
| Class F | -0.12% | -0.11% | -0.09% | 94% | 96% |
| Class TGM | -0.28% | -0.20% | -0.20% | 97% | 94% |
| Overall | -0.20% | -0.16% | -0.15% | 95% | 95% |

|  | Random Access Main 10 | | | | |
|---|---|---|---|---|---|
|  | Over ECM-6.0 | | | | |
|  | Y | U | V | EncT | DecT |
| Class F | -0.10% | -0.12% | -0.13% | 99% | 99% |
| Class TGM | -0.24% | -0.22% | -0.17% | 99% | 99% |
| Overall | -0.17% | -0.17% | -0.15% | 99% | 99% |

FIG. 22

BLOCK VECTOR PREDICTOR CANDIDATE SELECTION

CROSS-REFERENCE TO RELATED APPLICATIONS

This application claims the benefit of U.S. Provisional Application No. 63/388,552 filed on Jul. 12, 2022. The above-referenced application is hereby incorporated by reference in its entirety.

BACKGROUND

A computing device processes video for storage, transmission, reception, and/or display. Processing a video comprises encoding and/or decoding, for example, to reduce a data size associated with the video.

SUMMARY

The following summary presents a simplified summary of certain features. The summary is not an extensive overview and is not intended to identify key or critical elements.

A video may comprise a sequence of frames (pictures) displayed consecutively. Predictive encoding and decoding may involve the use of information associated with blocks, within a frame, to encode and/or decode other blocks in the same frame. For example, information associated with a block (e.g., luma and/or chroma components of the block) may be encoded using previously decoded information associated with a reference block in the same frame. The reference block may be indicated in the form of a block vector (BV) that represents the location of the reference block with respect to a current block being encoded or decoded. The BV may be indicated as a function of a block vector predictor (BVP) for reducing signaling overhead required for directly indicating the BV. An encoder and/or a decoder may determine one or more BVPs that are within a decoded region of the frame. From the multiple BVPs, the encoder and/or the decoder may determine a group of BVPs that point to locations near each other (e.g., located within a predefined area, within a predefined distance from each other, within a predefined minimum distance from a point, etc.) and select one of the BVPs based on a respective cost associated with each BVP. The encoder and/or decoder may select the BVP associated with the lowest cost of the group. The encoder and/or the decoder may repeat this process for other groups of BVPs from amongst the multiple BVPs. The selected BVPs associated with the lowest costs respectively from the groups of BVPs may then be used for encoding and/or decoding the BV and/or the reference block. Using one BVP per group may help to diversify a list of BVPs used to indicate a BV. A diverse list of BVPs may provide additional advantages such as reduced signaling overhead required for indicating the BV and improved predictions of the BVP.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 16 shows an example of intra block copy (IBC) for encoding.
FIG. 22 shows example test results associated with the disclosures herein.

DETAILED DESCRIPTION

Figure 1:
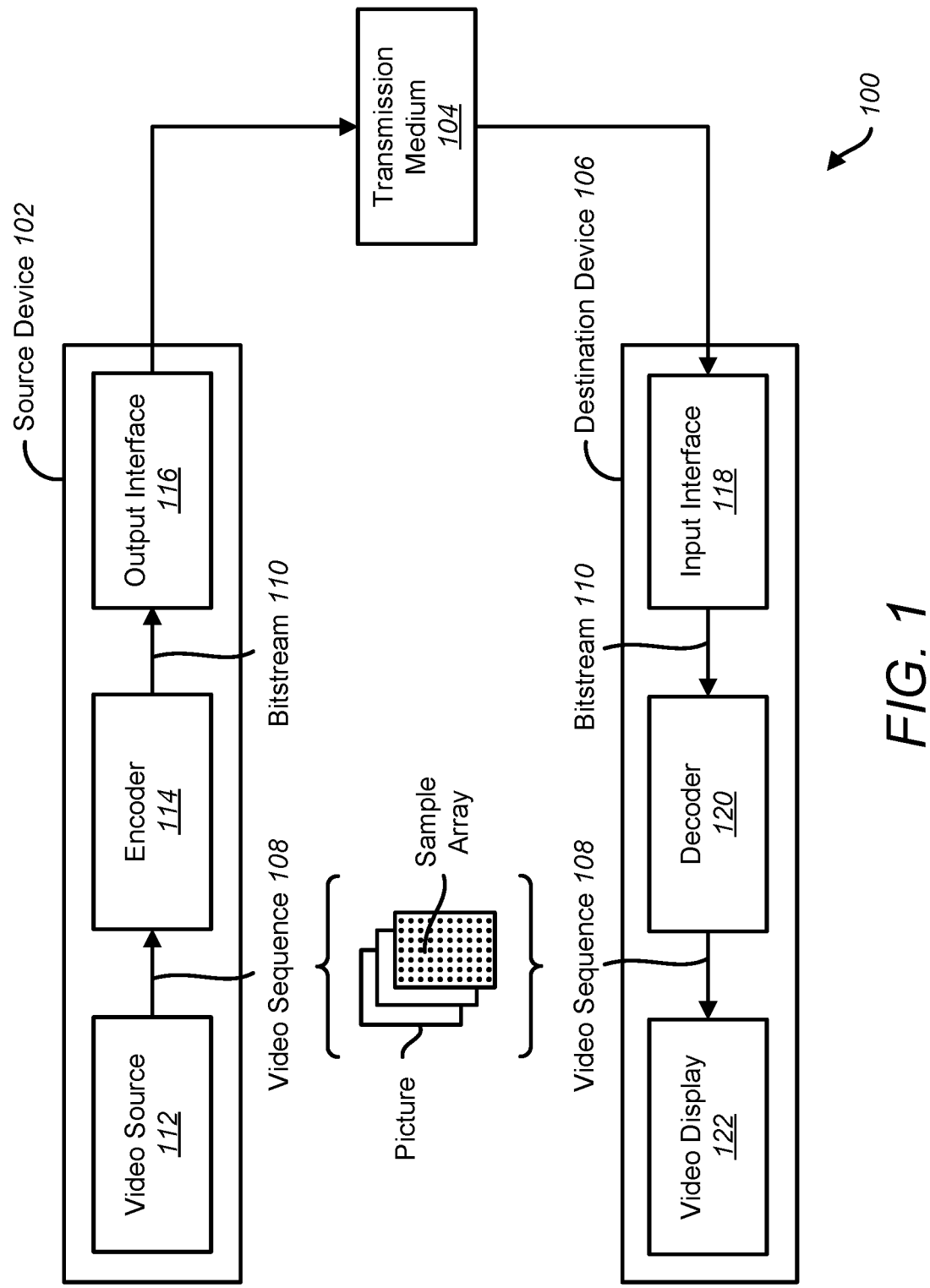
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
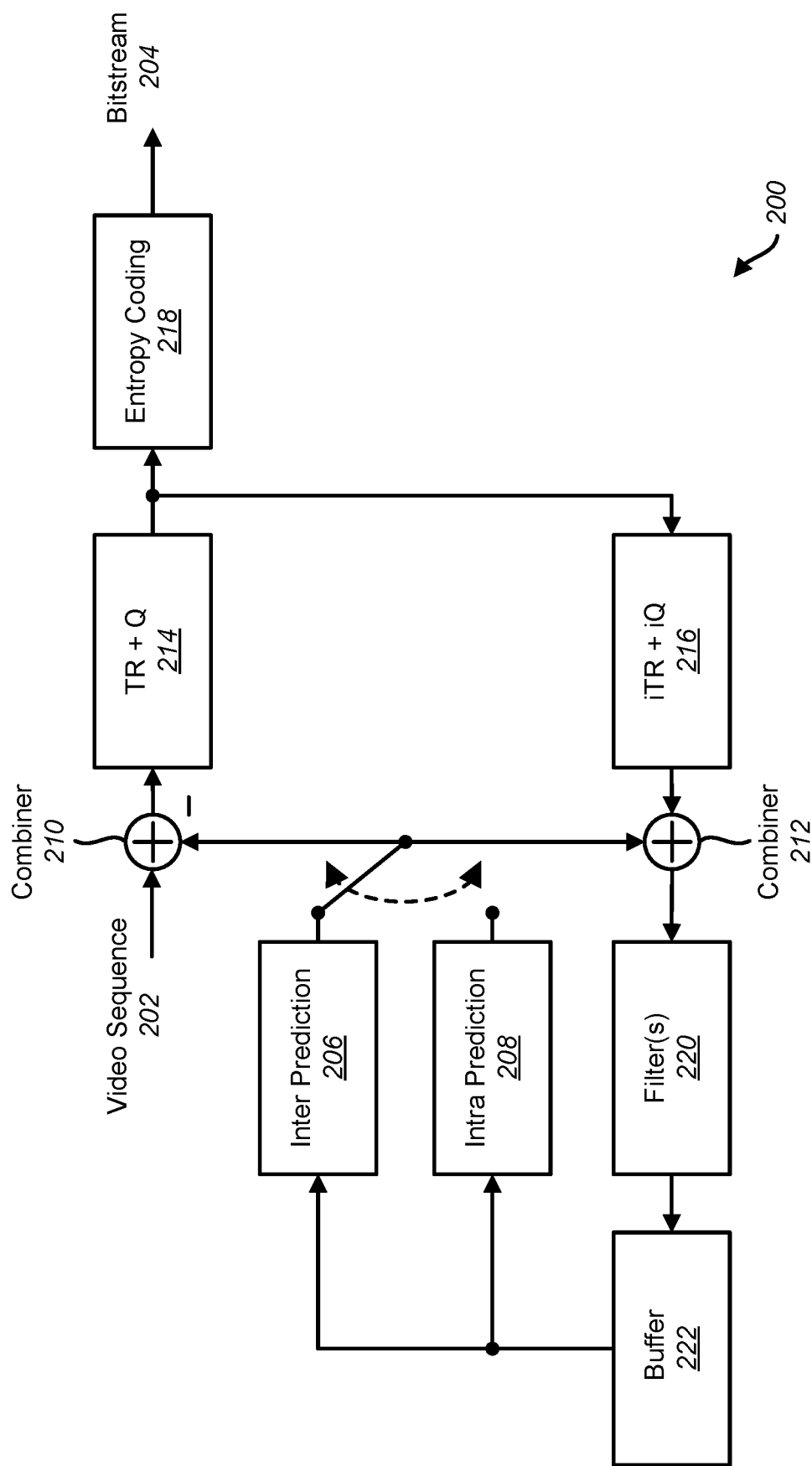
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
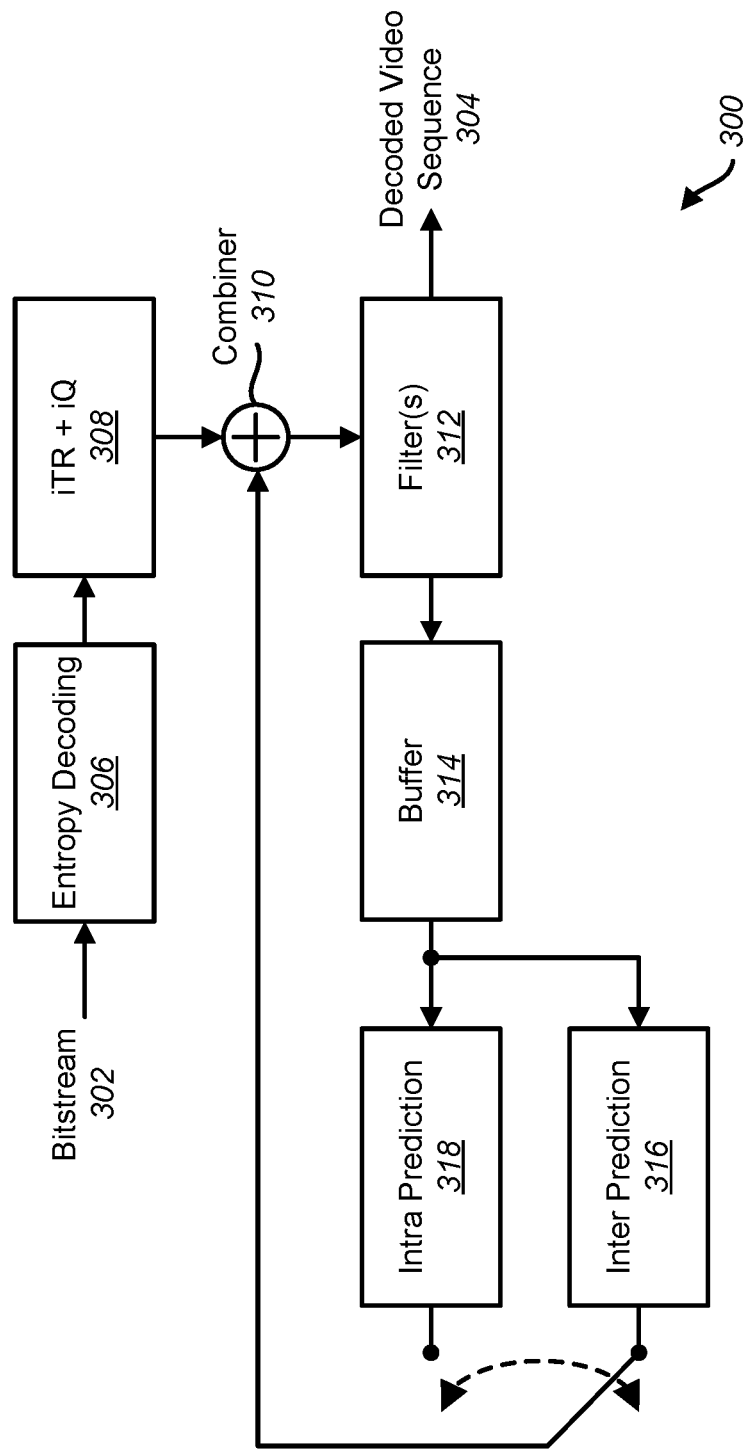
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG.

2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
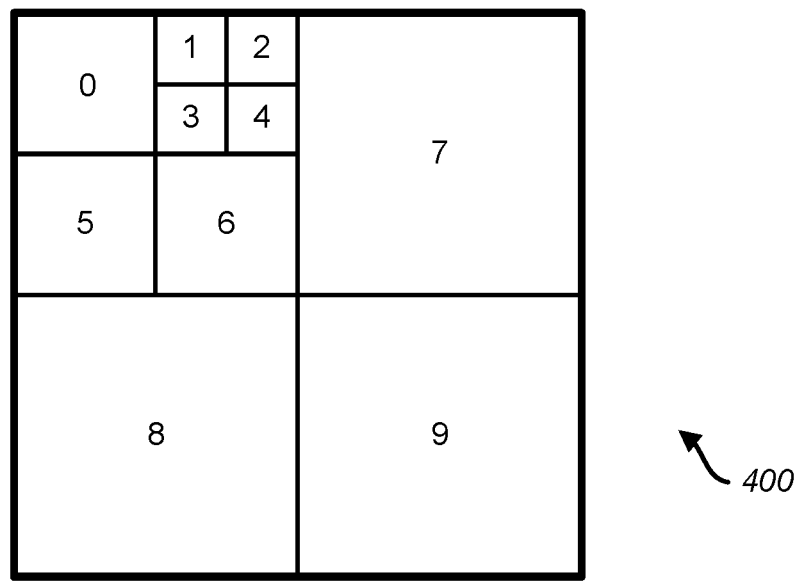
FIG. 4 shows an example quadtree partitioning of a coding tree block (CTB).
Figure 5:
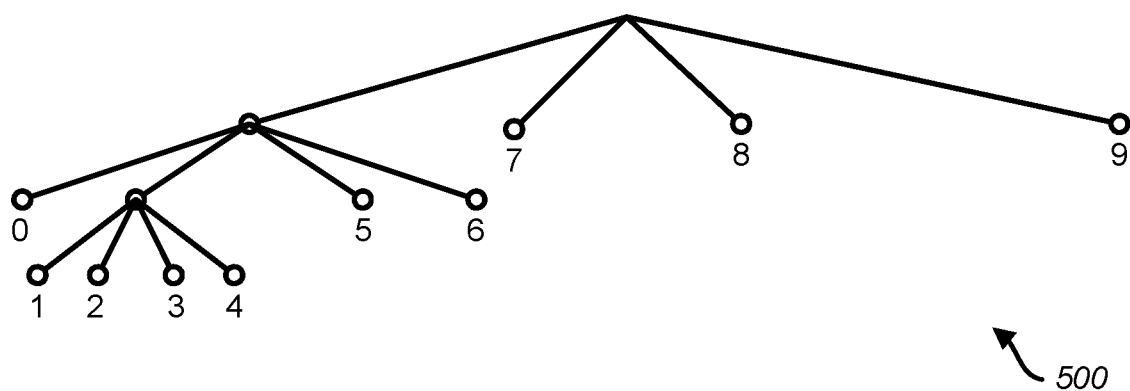
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
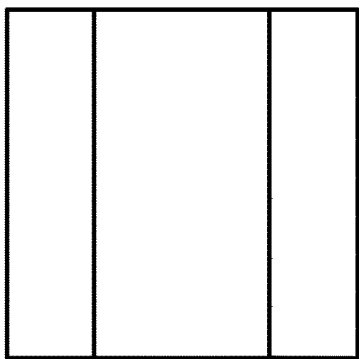
FIG. 6 shows example binary tree and ternary tree partitions.
Figure 6:
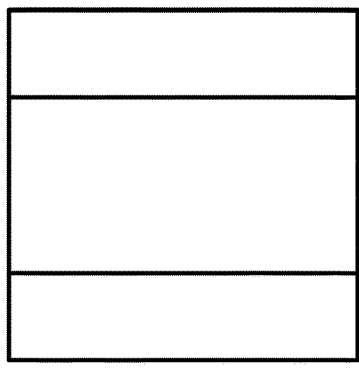
Figure 6:
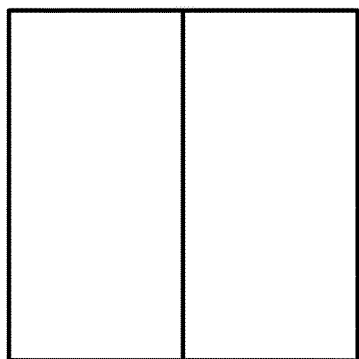
Figure 6:
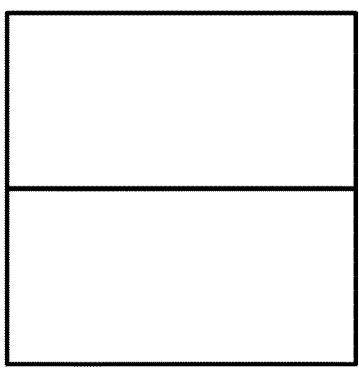

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
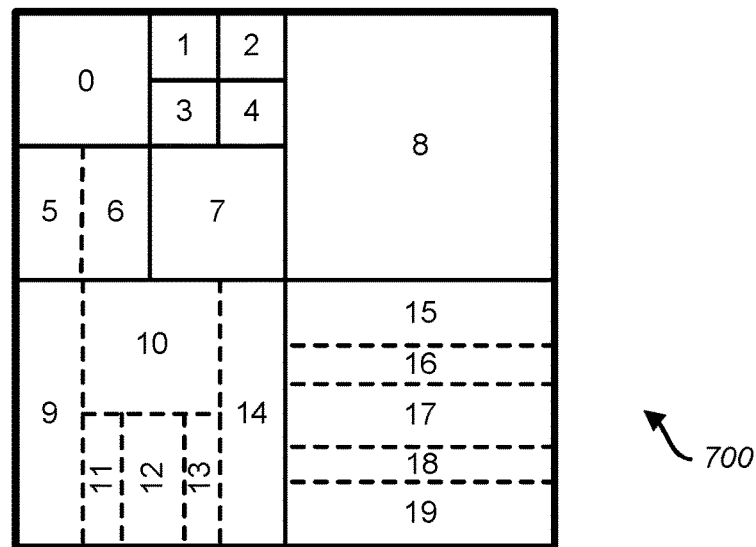
FIG. 7 shows an example of combined quadtree and multi-type tree partitioning of a CTB.
Figure 8:
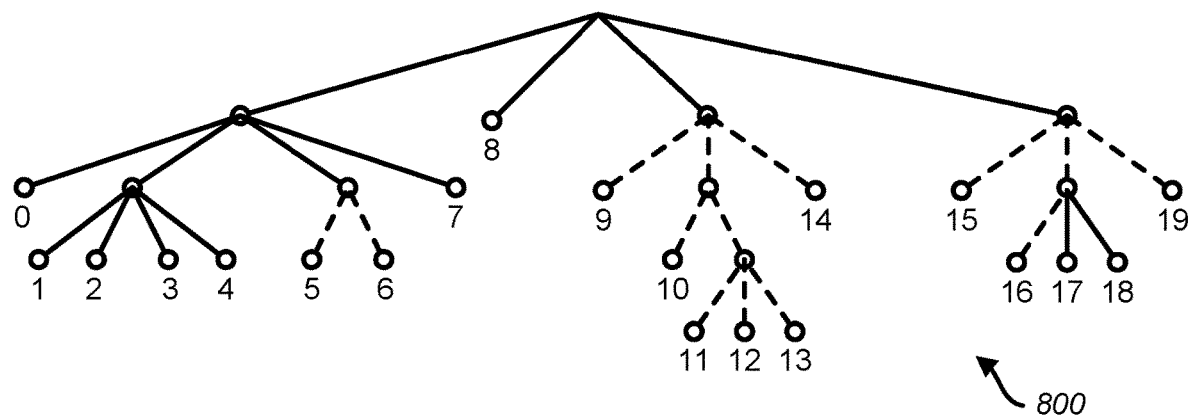
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
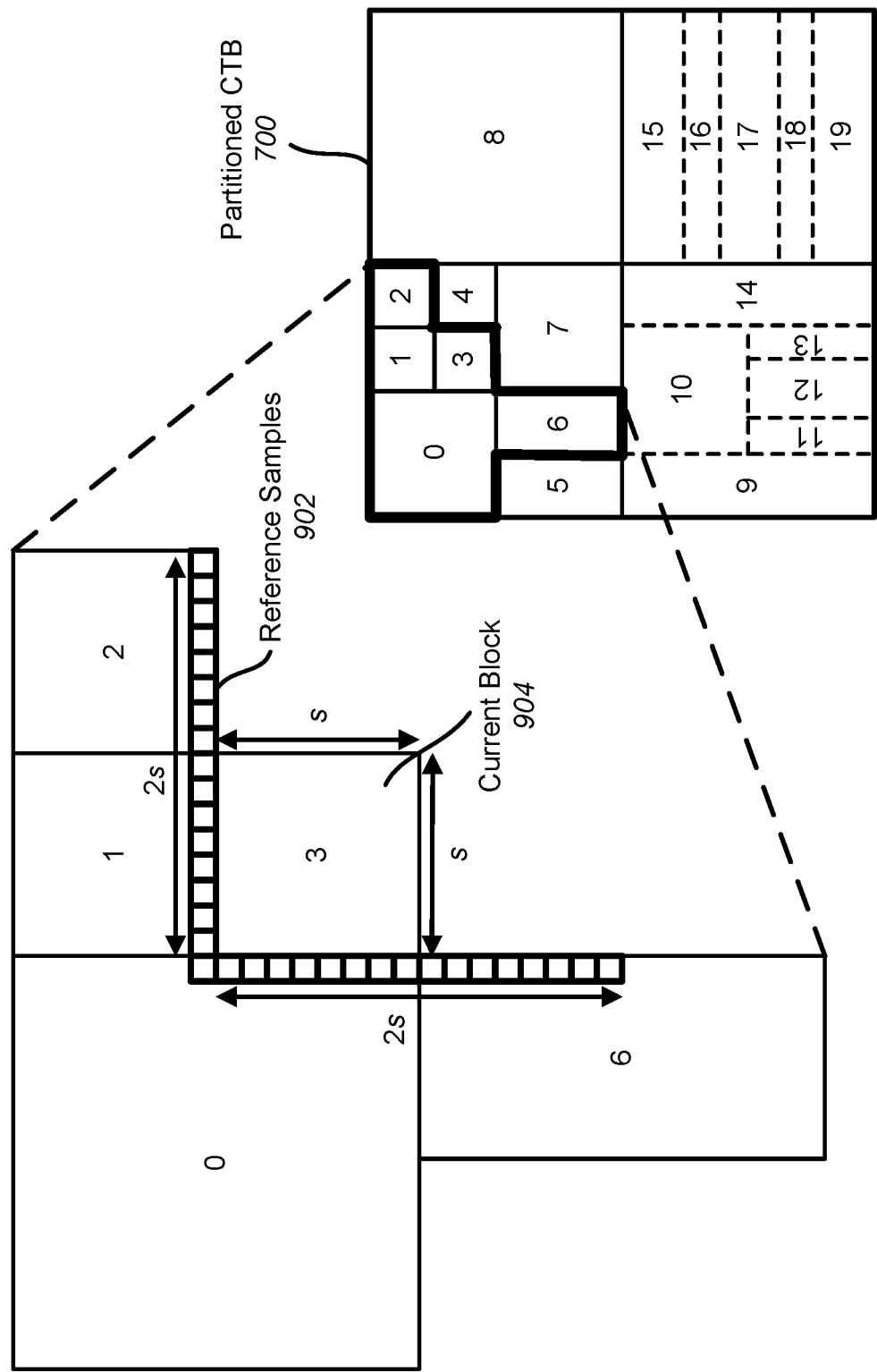
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2$h$ samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
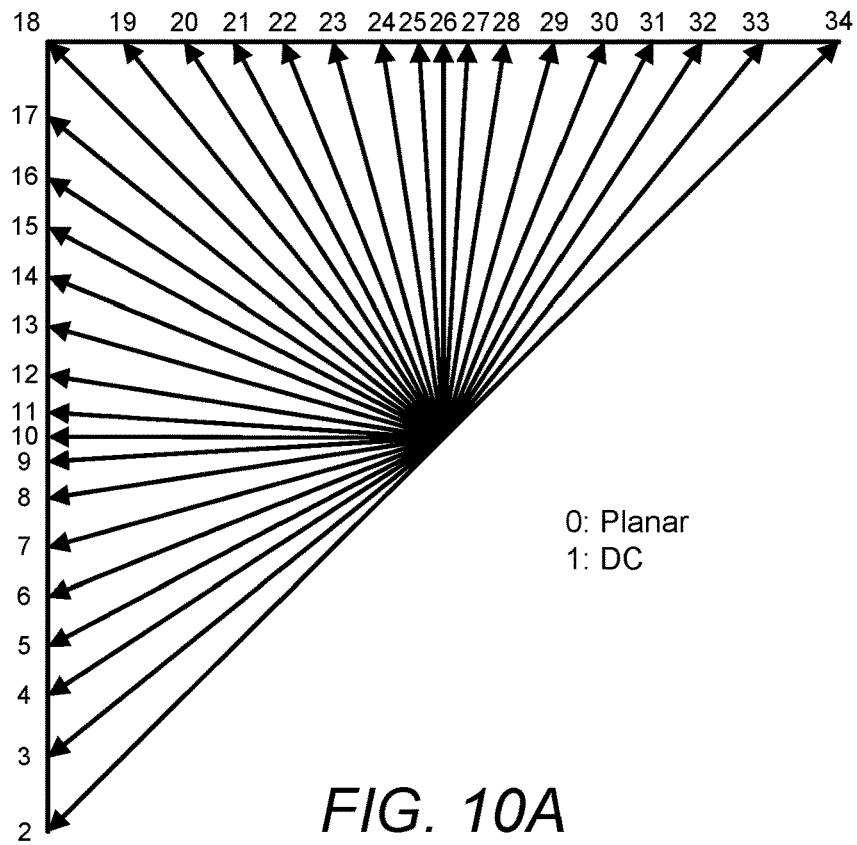
FIGS. 10A and 10B show example intra prediction modes.
Figure 10B:
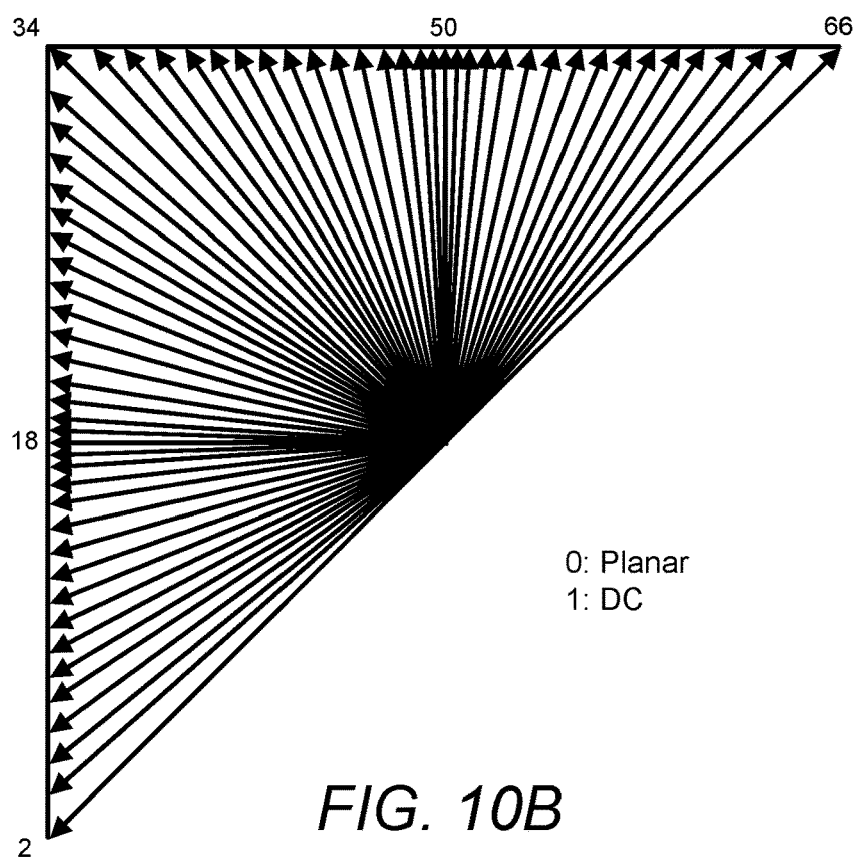

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
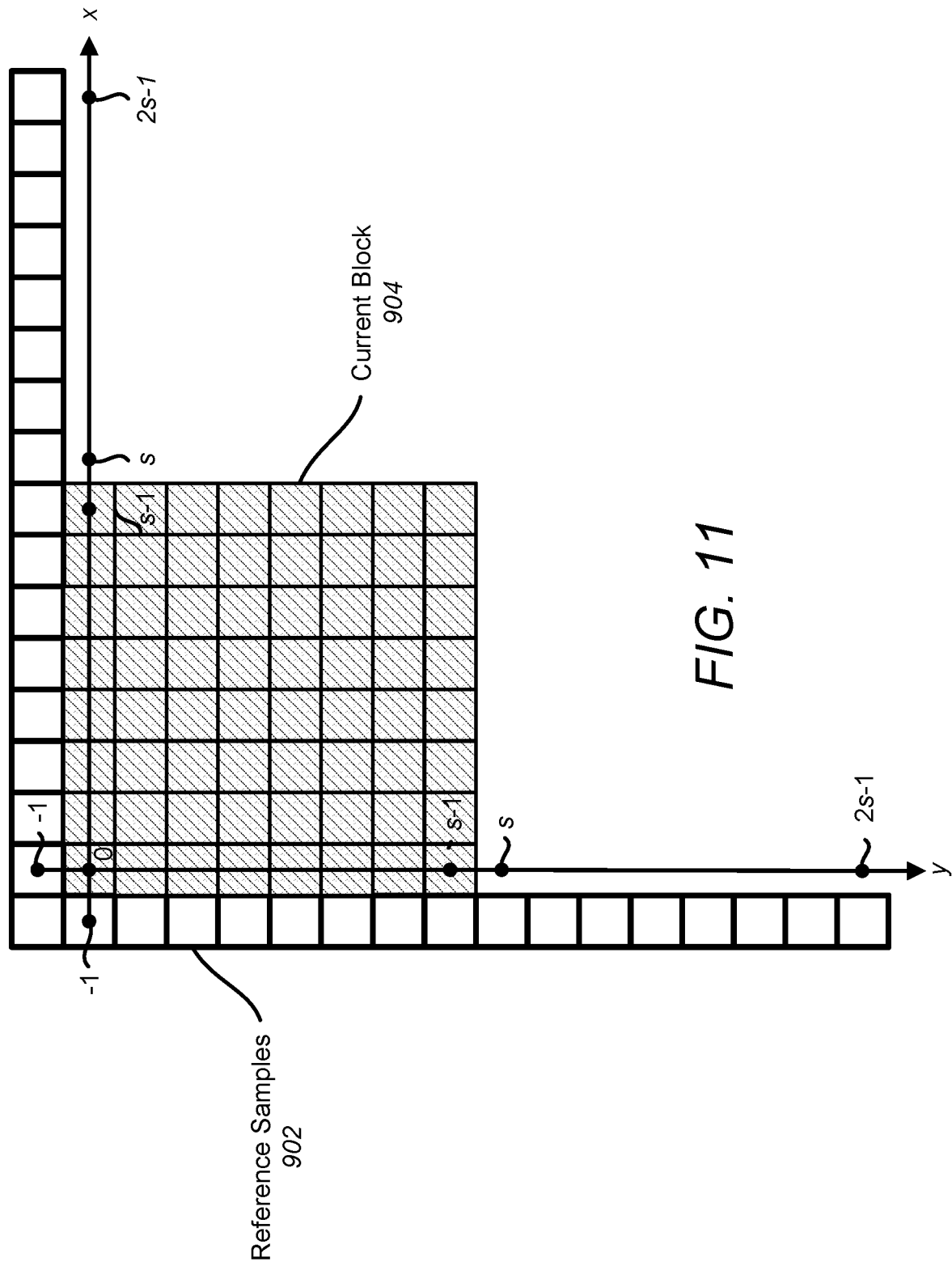
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x] = p[-1+x][-1], (x \geq 0). \quad (1)$$

The reference samples 902 to the left of the current block 904 may be placed in the one-dimensional array $ref_2[y]$:

$$ref_2[y] = p[-1][-1+y], (y \geq 0). \quad (2)$$

The prediction process may comprise determination of a predicted sample p [x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \quad (3)$$

where $$h[x][y] = (s-x-1) \cdot ref_2[y] + (x+1) \cdot ref_1[s] \quad (4)$$

may be the horizontal linear interpolation at the location [x][y] in the current block 904 and $$v[x][y] = (s-y-1) \cdot ref_1[x] + (y+1) \cdot ref_2[s] \quad (5)$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \quad (6)$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
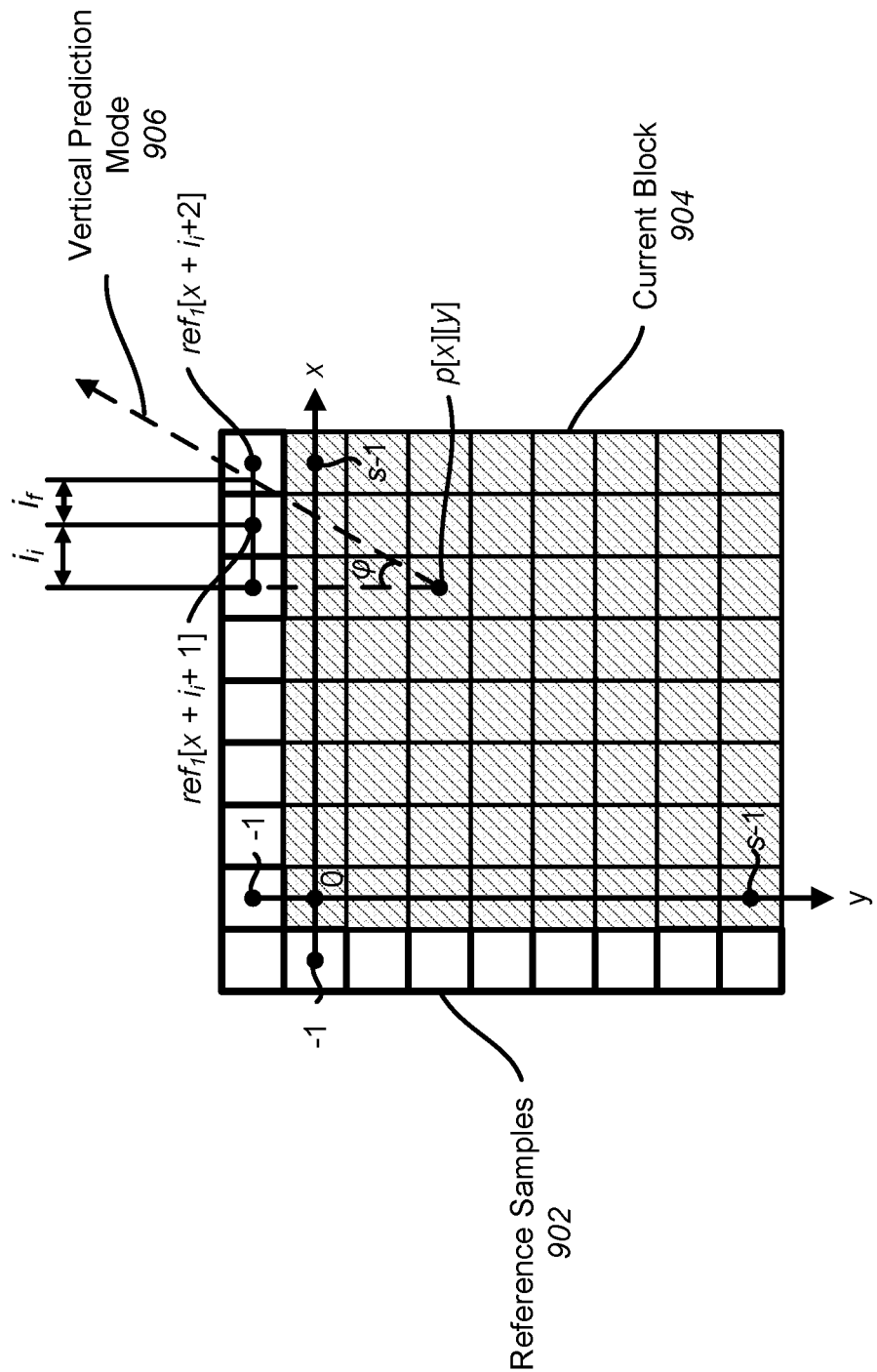
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y]=(1-i_f)\cdot ref_1[x+i_i+1]+i_f\cdot ref_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i=\lfloor (y+1)\cdot\tan\varphi\rfloor. \quad (8)$$

$i_f$ may be the fractional part of the horizontal displacement of the projection point relative to the location [x][y] and may be determined/calculated as:

$$i_f=((y+1)\cdot\tan\varphi)-\lfloor(y+1)\cdot\tan\varphi\rfloor, \quad (9)$$

where $\lfloor\cdot\rfloor$ is the integer floor function.

A location [x][y] of a sample in the current block 904 may be projected onto the vertical line of reference samples $ref_2[y]$, such as for horizontal prediction modes. A predicted sample p[x][y] for horizontal prediction modes may be determined/calculated as:

$$p[x][y]=(1-i_f)\cdot ref_2[y+i_i+1]+i_f\cdot ref_2[y+i_i+2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i=\lfloor(x+1)\cdot\tan\varphi\rfloor. \quad (11)$$

$i_f$ may be the fractional part of the vertical displacement of the projection point relative to the location [x][y]. $i_f$ may be determined/calculated as:

$$i_f=((x+1)\cdot\tan\varphi)-\lfloor(x+1)\cdot\tan\varphi\rfloor, \quad (12)$$

where $\lfloor\cdot\rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters one for each of the 32 possible values of the fractional part of the projected displacement if. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on if (e.g., similar to the two-tap FIR filter). For 1/32 sample accuracy, a set of 32 different four-tap FIR filters may comprise up to 32 different four-tap FIR filters one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y]=\sum_{i=0}^{3}fT[i]\cdot ref_1[x+ildx+i], \quad (13)$$

where fT[i], i=0 . . . 0.3, may be the filter coefficients, and Idx is integer displacement. A predicted sample p[x][y], for horizontal prediction modes, may be determined based on the four-tap FIR filter as:

$$p[x][y]=\sum_{i=0}^{3}fT[i]\cdot ref_2[y+ildx+i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
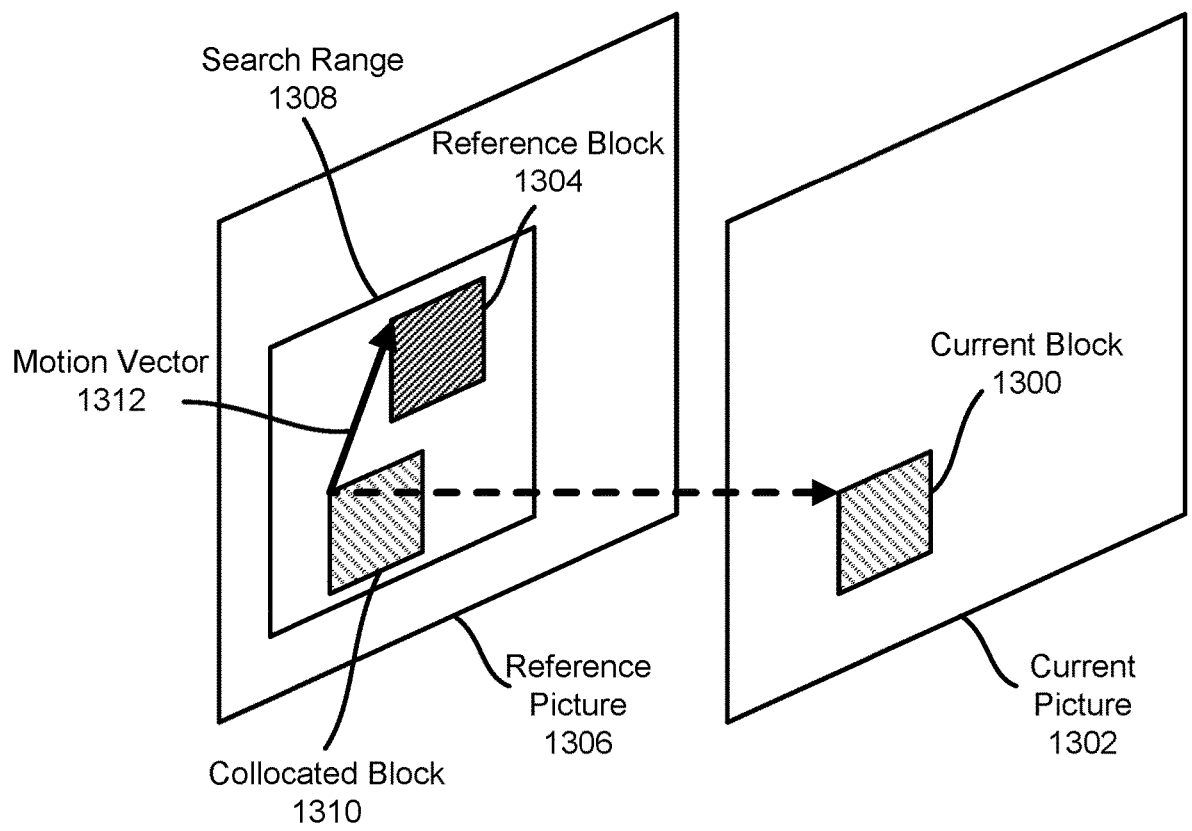
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
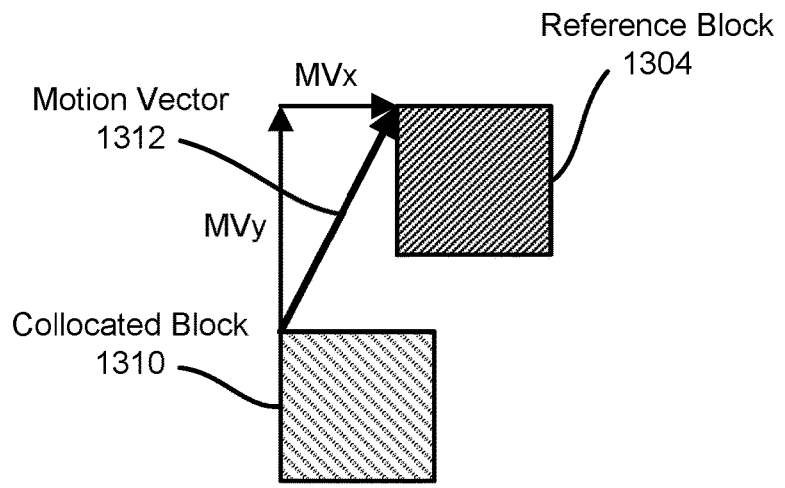
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, ¹/₁₆, ¹/₃₂, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
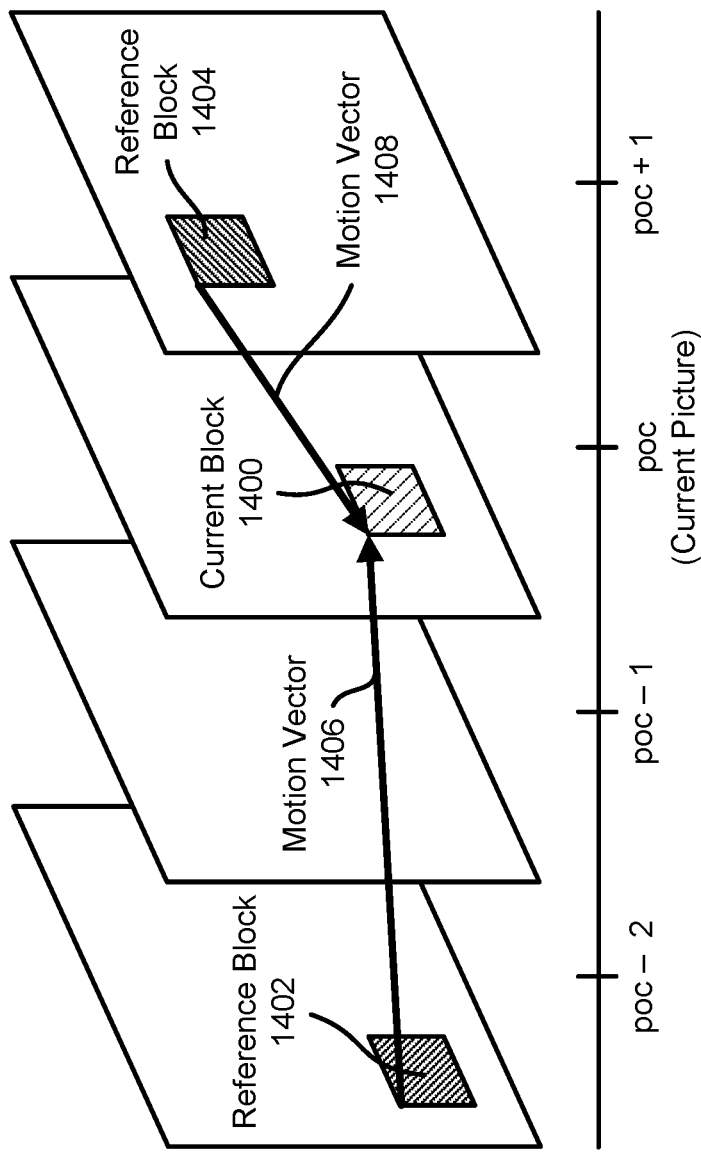
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components $MVD_x$ and $MVD_y$. $MVD_x$ and $MVD_y$ may be determined/calculated as:

$$MVD_x = MV_x - MVP_x, \quad (15)$$

$$MVD_y = MV_y - MVP_y, \quad (16)$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream.

The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
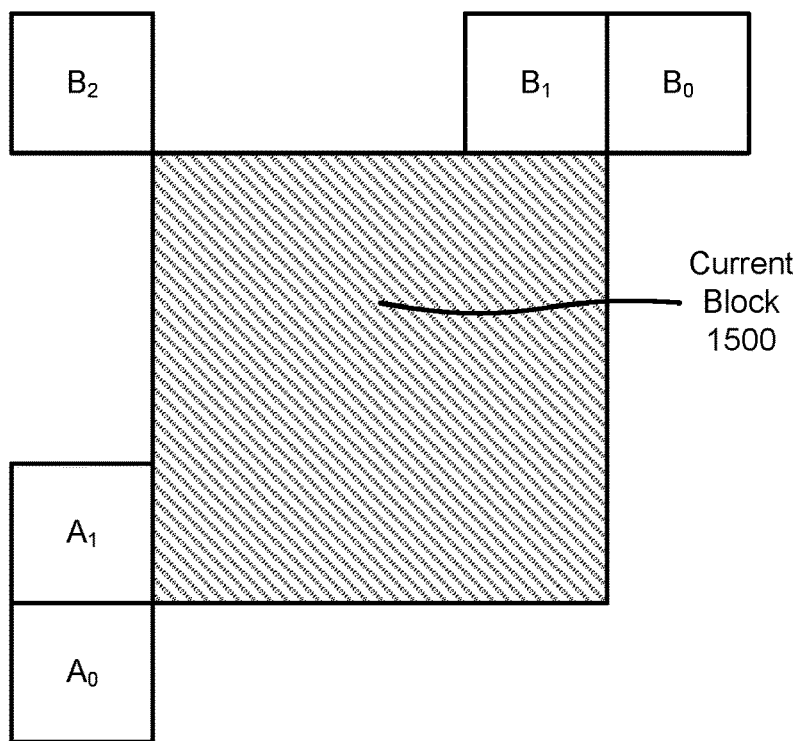
FIG. 15A shows example spatial candidate neighboring blocks for a current block.
Figure 15B:
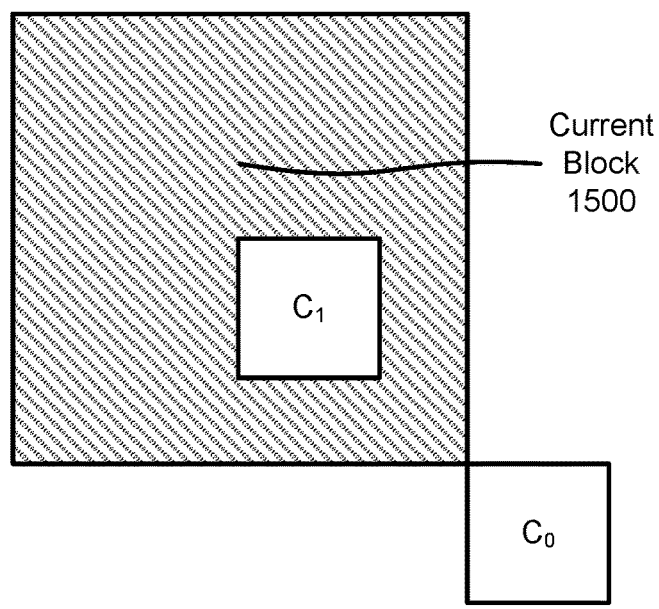
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component (BVx) and a vertical component (BVy)) relative to a position of the current block being coded, the BVD may represented by two components $BVD_x$ and $BVD_y$. $BVD_x$ and $BVD_y$ may be determined/calculated as:

$$BVD_x=BV_x-BVP_x, \quad (17)$$

$$BVD_y=BV_y-BVP_y. \quad (18)$$

BVDx and BVDy may respectively represent horizontal and vertical components of the BVD. BVPx and BVPy may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted A0, A1, B0, B1, and B2.

An encoder (e.g., the encoder 114 as shown in FIG. 1 or the encoder 200 as shown in FIG. 2) may further encode a BV using merge mode as explained herein. Using merge mode, an encoder may reuse the same BV of a neighboring or other block for IBC prediction of a current block being encoded. Because the same BV of a neighboring or other block is used, a BVD may not need to be signaled, and/or the signaling overhead for signaling the BV of the current block may be relatively small in size. Both an encoder (e.g., the encoder 114 as shown in FIG. 1 or the encoder 200 as shown in FIG. 2) and a decoder (e.g., the decoder 120 as shown in FIG. 1 or the decoder 300 as shown in FIG. 3) may generate a candidate list of BVPs from neighboring or other blocks of the current block being encoded for the merge mode. An encoder may then determine to use (or inherit) one of the BVPs in the candidate list for predict the BV information of the current block being encoded. An encoder may signal, in the bitstream, an indication of the determined BVP from the candidate list. An encoder, for example, may signal an index of the list of candidate BVPs that indicates the determined BV. A decoder may generate, determine, or construct the list of candidate BVPs for the merge mode in the same manner as the encoder. The BVP may be indicated in the bitstream to the decoder in the form of an index indicating the BVP determined by the encoder from among the list of candidate BVPs. A decoder may then decode the current block by determining and/or generating the reference block, corresponding to the prediction of the current block, using the determined BV and combining the prediction with the prediction error.

A list of candidate BVPs for merge mode or AMVP mode (e.g., in HEVC, VVC, or other implementations) may comprise different types of BVP candidates. A list of candidate BVPs, for example, may include up to four or more spatial merge candidates (e.g., A0, A1, B0, B1, B2) that may be derived from the five spatial neighboring blocks used in AMVP or merge for IBC, one or more temporal merge candidate derived from temporal co-located blocks used in AMVP for IBC, pairwise-average candidates that represent an average of two candidate BVPs used in AMVP or merge for IBC (e.g., an average of two spatial candidates such as the first spatial candidate and the second spatial candidate in a list of candidate BVPs), and/or one or more additional history-based BVPs (e.g., one or more BVs previously used at any location that are stored in a history-based motion vector prediction list). A list of candidate BVPs having different BVP candidate types may be integrated into any coding standard, format, and/or protocol (e.g., in HEVC, VVC, and/or other video coding standards/formats/protocols). Any combination of BVP candidate types (e.g., spatial merge candidates, temporal merge candidates, pairwise-average candidates, history-based candidates, etc.) may be used.

In some examples, an encoder and/or a decoder may pad the list of candidate BVPs. When an encoder and/or a decoder constructs a list of candidate BVPs for either AMVP mode or merge mode, for example, there may be instances where an insufficient quantity of candidate BVPs are added to the list of candidate BVPs based on the sources described herein (e.g., BV information regarding neighboring blocks, temporally co-located blocks, and/or history-based BVs). One or more candidate BVPs may not be available from the sources described herein, for example, due to neighboring blocks or other blocks being coded in intra prediction mode or inter prediction mode. An encoder and/or a decoder may pad the list of candidate BVPs with one or more BVPs with both the horizontal and vertical components of the BVP equal to zero. A candidate BVP with a horizontal component and a vertical component both equal to zero may be referred to, and is referred to herein for convenience, as a zero candidate BVP.

Figure 17A:
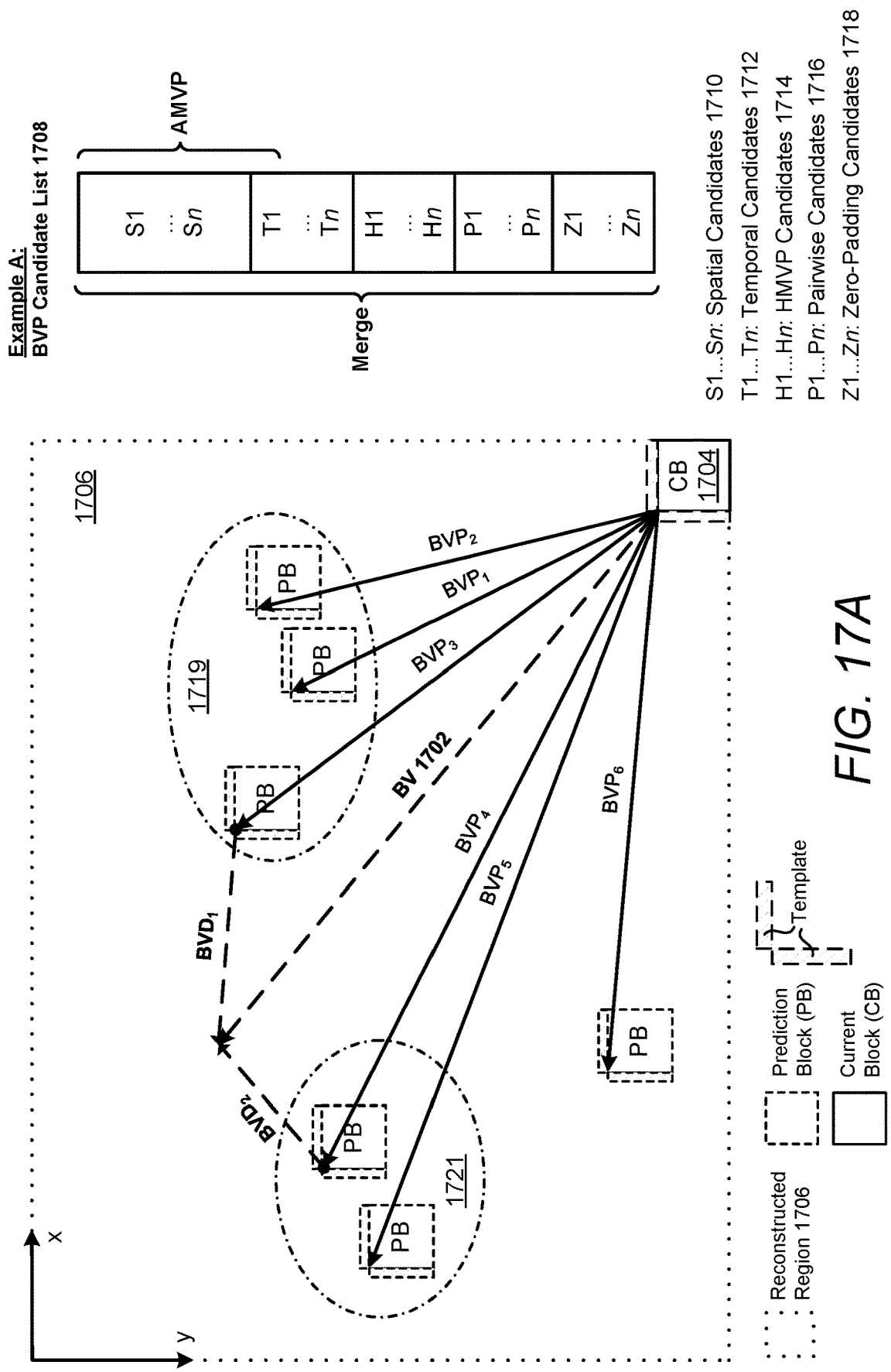
FIG. 17A shows an example of constructing a list of BVP candidates.

FIG. 17A shows an example of constructing a list of BVP candidates. A list of BVP candidates may be constructed, generated, created, or otherwise determined for merge mode or AMVP mode. A list of BVP candidates constructed for merge mode may be referred to, and is referred to herein for convenience, as a merge list. A list of BVP candidates constructed for AMVP mode may be referred to, and is referred to herein for convenience as an AMVP list. A block vector (BV) 1702 for a current block (CB) 1704 may be predictively coded based on one or more block vector predictor (BVP) candidates ($BVP_1$-$BVP_6$) within a reconstructed region 1706 of a picture. It should be appreciated that, while the disclosures herein are provided by way of example in the contexts of AMVP lists and merge lists, such disclosures apply to any list of candidate BVPs that are used for determining a BV for encoding and/or decoding.

In FIG. 17A, the BVP candidates are denoted, by way of example, as $BVP_1$, $BVP_2$, $BVP_3$, $BVP_4$, $BVP_5$, and $BVP_6$. Both an encoder and a decoder may construct, generate, create, or otherwise determine a BVP candidate list 1708 (e.g., a merge list or an AMVP list). The BVP candidates for a merge list or an AMVP list may comprise spatial candidates 1710 (S1-Sn). The spatial candidates may include, for example, up to five spatial candidates (e.g., S1, S2, S3, S4, and S5) or more spatial candidates. The spatial candidates (e.g., S1, S2, S3, S4, and S5) may be derived, for example, from five spatial candidate blocks respectively denoted $A_0$, $A_1$, $B_0$, $B_1$, and $B_2$ as described herein (e.g., with respect to FIG. 15A). The BVP candidate list 1708 may be constructed, generated, created or otherwise determined, for example, at least by including up to five of the spatial candidates 1710 in the BVP candidate list 1708 (e.g., adding, appending, inserting the spatial candidates to or in the list). The BVP candidate list 1708 may be constructed, generated, created or otherwise determined, for example, at least by determining whether a BVP candidate is identical to another BVP candidate in BVP candidate list 1708, and if so, not including the identical BVP candidate in the BVP candidate list 1708. The BVP candidate list 1708 may be constructed, generated, created or otherwise determined, for example, at least by determining whether a BVP candidate is valid, and if the BVP candidate is not valid (or invalid), not including the invalid BVP candidate in the BVP candidate list 1708. A BVP candidate may be valid, for example, if the BVP candidate is within the reconstructed region 1706 (or, in other examples, within a reference region (e.g., a sub-region) of the reconstructed region 1706). A BVP candidate may be within the reconstructed region (or within a reference region of the reconstructed region 1706), for example, if an endpoint of the BVP candidate is located within the reconstructed region 1706 (or located within a reference region of the reconstructed region 1706). A BVP candidate may be invalid, for example, if the BVP candidate is not within the reconstructed region (or, in other examples, not within a reference region of the reconstructed region 1706). A BVP candidate may be invalid, for example, if it is located within a prediction block that is not entirely located within the reconstructed region 1706 and/or if a template of that PB is not entirely locating within the reconstructed region. A BVP candidate may not be within the reconstructed region (or not within a reference region of the reconstructed region 1706), for example, if an endpoint of the BVP candidate is not located within the reconstructed region 1706 (or located within a reference region of the reconstructed region 1706).

The BVP candidate list 1708 may be constructed, generated, created or otherwise determined, for example, at least by including one or more temporal candidates 1712 to BVP candidate list 1708. One or more temporal candidates 1712 may be included in the BVP candidate list 1708, for example, if spatial candidates (e.g., the spatial candidates 1710) are not available or otherwise identical. The temporal candidates 1712 may be derived, for example, from temporal candidate blocks (e.g., candidate blocks $C_0$ and $C_1$ as described herein, e.g., with respect to FIG. 15B). The BVP candidate list 1708 may be constructed, generated, created or otherwise determined, for example, at least by including one or more history-based motion vector prediction (HMVP) candidates 1714 to the BVP candidate list 1708. The HMVP candidates 1714 may be derived, for example, from BVs previously used for prediction at a location within the reconstructed region 1706. The BVP candidate list 1708 may be constructed, generated, created or otherwise determined, for example, at least by including one or more pairwise candidates 1716 to the BVP candidate list 1708. The pairwise candidates 1716 may be derived, for example, by averaging other BVP candidates. The BVP candidates averaged to determine a pairwise candidate may include, for example, the first two BVP candidates of the BVP candidate list 1708 or any other two BVP candidates of the BVP candidate list. In another example, if spatial candidates, temporal candidates, HMVP candidates, or pairwise candidates are not available, the BVP candidate list 1708 may be constructed, generated, created or otherwise determined, for example, at least by including one or more zero-padding candidates 1718. The zero-padding candidates 1718 may comprise, for example, one or more zero candidate BVPs as described herein.

The BVP candidate list 1708 may be considered to be complete upon the BVP candidate list 1708 reaching a threshold quantity of BVP candidates. An AMVP list, for example, may comprise up to six (6) BVP candidates prior to a pruning procedure that reduces the quantity of BVP candidates in the AMVP list. A merge list may comprise, for example, up to twenty (20) BVP candidates prior to a pruning procedure that reduces the quantity of BVP candidates in the merge list. An AMVP list or a merge list may include more or fewer BVP candidates, for example, based on preferences and/or requirements related to efficiency trade-offs, memory requirements, and/or computational complexity.

The BVP candidates (or a portion of the BVP candidates) in the BVP candidate list 1708 may be reordered. The BVP candidates (or a portion thereof) may be reordered, for example, before a pruning procedure that reduces the quantity of BVP candidates in the BVP candidate list 1708. The BVP candidates (or a portion thereof) may be reordered based on a cost respectively determined for each BVP candidate in BVP candidate list 1708. The cost may be a template matching (TM) cost. The BVP candidates of a merge list, for example, may be reordered based on a size of the TM cost respectively determined for each BVP candidate (e.g., smallest to largest TM cost or largest to smallest TM cost). The first n BVP candidates (e.g., the first three (3) BVP candidates) of an AMVP list, for example, may be reordered, for example, based on a TM cost. The first n BVP candidates (e.g., the first three (3) BVP candidates) of an AMVP list, for example, may be refined using TM before being ordered (or reordered) based on a TM cost determined for the BVP candidates of the AMVP list. More generally, an order of the TM costs associated with the BVP candidates may be determined, and the BVP candidates may be pruned based on the determined order.

The BVP candidate list 1708 may be constructed, generated, created or otherwise determined, for example, at least by pruning the BVP candidate list 1708. A BVP candidate may be removed (e.g., "pruned") from the BVP candidate list 1708, for example, based on the BVP candidate being identical to another BVP candidate in BVP candidate list 1708. A BVP candidate may be removed (e.g., "pruned") from the BVP candidate list 1708, for example, based on the BVP candidate being invalid as described herein. One or more BVP candidates may be removed (e.g., "pruned") from BVP candidate list 1708, for example, based on a cost respectively determined for each BVP candidate in the BVP candidate list 1708. One or more BVP candidates may be removed from the BVP candidate list 1708, for example, after reordering the BVP candidate list 1708. Pruning the BVP candidate list 1708 based on the costs respectively determined for the BVP candidates may include, for example, removing (e.g., "pruning") n BVP candidates with the largest costs from the BVP candidate list 1708. BVP candidates having the largest costs may be removed from the BVP candidate list 1708, for example, for ensuring that a pruned merge list or a pruned AMVP list does not exceed a threshold quantity of BVP candidates, for example as discussed herein with reference to FIG. 17B.

Figure 17B:
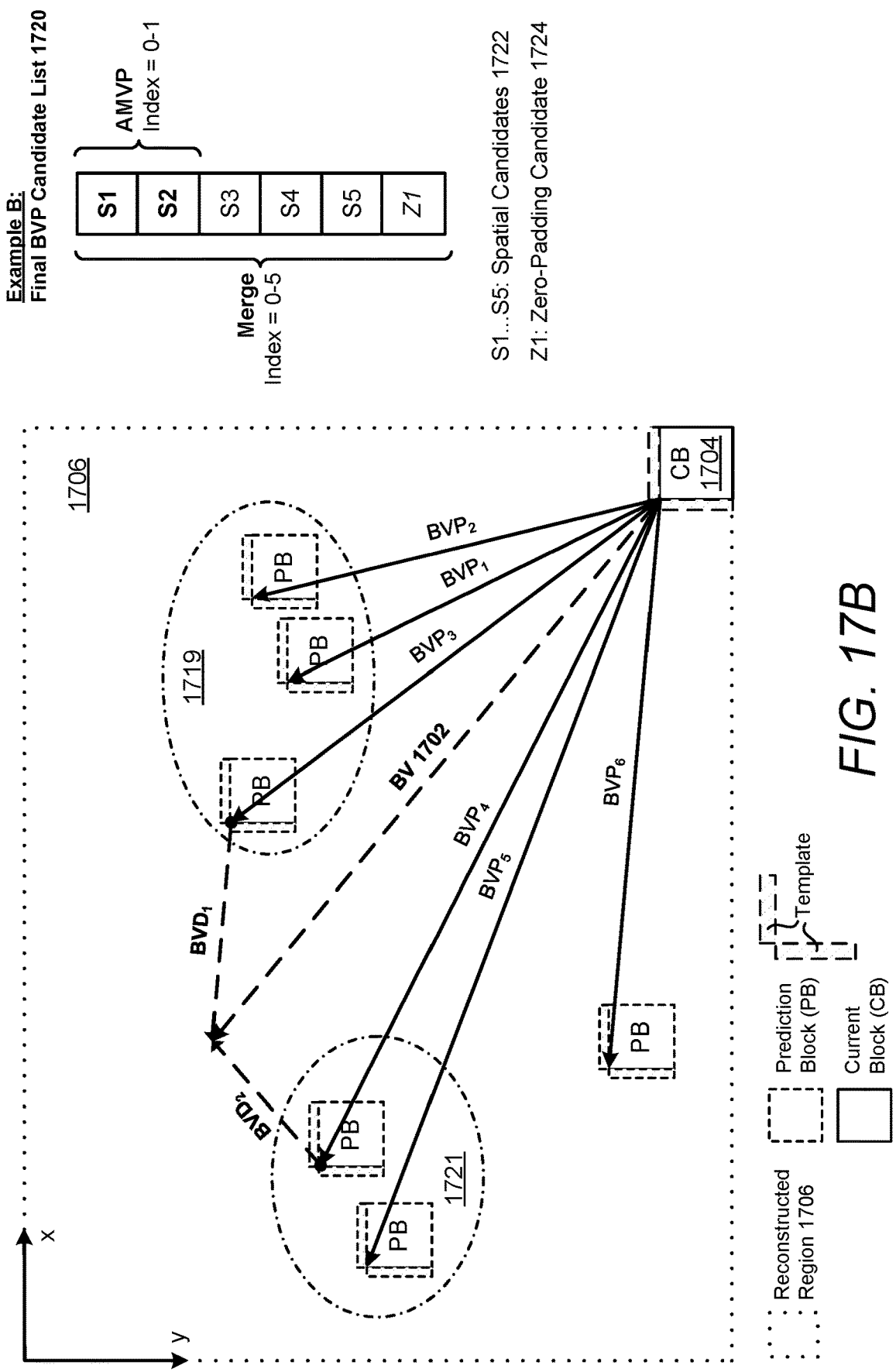
FIG. 17B shows an example of a constructed list of BVP candidates.

FIG. 17B shows an example of a constructed list of BVP candidates. The constructed list of BVP candidates may be a merge list or an AMVP list as described herein. After constructing, generating, creating, or otherwise determining the BVP candidate list 1708 as described herein, A final BVP candidate list 1720 may be constructed, generated, created, or otherwise determined based, for example, on pruning one or more BVP candidates from the BVP candidate list 1708. The final BVP candidate list 1720 may be constructed, generated, created, or otherwise determined, for example, after constructing, generating, creating, or otherwise determining the BVP candidate list 1708.

The final BVP candidate list 1720 shown by way of example in FIG. 17B may be constructed, generated, created, or otherwise determined, for example, by pruning the BVP candidate list 1708. The BVP candidates of the final BVP candidate list 1720 shown by way of example in FIG. 17B have not been reordered. The final BVP candidate list 1720, in this example, includes a total of six (6) BVP candidates, which correspond to an index range of 0-5. A merge list may include, for example, all six BVP candidates of the final BVP candidate list 1720. The index range of 0-5 may indicate, for example, the BVP candidates of the merge list that an encoder may signal to a decoder (e.g., by signaling a selected index). An AMVP list may include fewer BVP candidates than the final BVP candidate list 1720. An AMVP list may have, for example, a total of two (2) BVP candidates from the final BVP candidate list 1720, which correspond to an index range of 0-1. The index range of 0-1 may indicate, for example, the BVP candidates of the AMVP list that an encoder may signal to a decoder (e.g., by signaling a selected one of the indices). The final BVP candidate list 1720, in this example, includes five spatial candidates 1722 (e.g., S1, S2, S3, S4, and S5) and one zero-padding candidate 1724 (e.g., Z1). The merge list, in this example, includes six total BVP candidates including the five spatial candidates 1722 (e.g., at indices 0-4) and the zero-padding candidate (e.g., at index 5). The AMVP list, in this example, includes two total BVP candidates including two of the spatial candidates 1722 (e.g., at indices 0-2). One additional zero-padding candidate 1724 (e.g., Z1), is included in the final BVP candidate list 1720 to ensure the final BVP candidate list includes a threshold quantity of BVP candidates (e.g., six total BVP candidates) as described herein.

An encoder (e.g., the encoder 114 as shown in FIG. 1 or the encoder 200 as shown in FIG. 2) may select a BVP candidate from the final BVP candidate list 1720 to be used to predict the BV 1702 for the CB 1704. An encoder may signal, for example in a bitstream, an indication of the selected BVP candidate from final BVP candidate list 1720. An encoder may signal, for example, an index of the final BVP candidate list 1720 to indicate the selected BVP candidate used to predict the BV 1702 for the CB 1704. A decoder (e.g., the decoder 120 as shown in FIG. 1 or the decoder 300 as shown in FIG. 3) may construct, generate, create, or otherwise determine the list of BVP candidates in the same manner as the encoder as described herein. The selected BVP candidate may be indicated, for example, in the bitstream to the decoder in the form of an index of final BVP candidate list 1720 indicating the selected BVP candidate. A decoder may decode the CB 1704, for example, by determining the prediction block corresponding to the prediction of the CB 1704 based, at least in part, on the selected BVP candidate, and combining the prediction with a prediction error.

The BVP candidates selected for a final list of BVP candidates may come from multiple sources, and available BVP candidates may be pruned to meet a threshold quantity of BVP candidates (e.g., 2 total BVP candidates for an AMVP list and 6 total BVP candidates for a merge list). Pruning may, for example, remove duplicate and/or invalid BVP candidates as described herein, but BVP candidates that are similar to each other may not be removed (e.g. "pruned") from the final list of BVP candidates. A final list of BVP candidates pruned of duplicate and/or invalid BVP candidates, therefore, may still include BVP candidates that are similar to each other. As a result, an AMVP list or a merge list may comprise similar BVP candidates that may not accurately predict a BV or may predict a BV with relatively the same accuracy. In other words, pruning only duplicate and/or invalid BVP candidates may result in a final list of BVP candidates (and by extension a merge list or an AMVP list) that lacks diversity among the selected BVPs.

As an example, an AMVP list may comprise only two BVP candidates. Pruning a list of BVP candidates may remove only duplicate or invalid BVP candidates. The two BVP candidates in the AMVP list, therefore, may be similar to each other, which may not improve the prediction of the BV. The two BVP candidates may be selected, for example, based on a cost (e.g., a TM cost). The two BVP candidates selected for the AMVP list, in this example, may comprise the two BVP candidates with the smallest cost. Although the two BVP candidates may not have the same cost, they may be similar to each other, which may not improve the prediction of the BV. The marginal benefit of the second BVP candidate relative to the first BVP candidate may be small because two BVP candidates may offer essentially the same prediction for the BV. Techniques using lists of BVP candidates may prune available BVP candidates but may not address the lack of diversity between the BVP candidates selected for the final list of BVP candidates used to construct, generate, create, or otherwise determine merge lists and AMVP lists.

A list of BVP candidates that lacks diversity may indicate PBs near the same area of the reconstructed region of a picture. As seen in FIGS. 17A-B, for example, $BVP_1$-$BVP_3$ are each located in a similar area 1719 of the reconstructed region 1706, and $BVP_4$-$BVP_5$ are each located in a similar area 1721 of the reconstructed region 1706. The PBs in the respective areas 1719 and 1721 of the reconstructed region 1706 may be similar to one another and have similar templates (e.g., due to representing a similar portion of the picture). BVP candidates that converge to one or more areas of a reconstructed region may indicate PBs that are located relatively far from an optimal RB (e.g., one of the available PBs) in the reconstructed region of the picture. BVPs located relatively far from the optimal RB may result in a relatively larger BVD (e.g., as compared to a BVP located relatively closer to the optimal RB), which may increase the signaling overhead needed to signal the relatively larger BVD to the decoder compared to a BVP located relatively closer to the optimal RB that would result in a smaller BVD requiring less signaling overhead.

Various examples described herein may enable diversifying the BVP candidates selected for an AMVP list or merge list. By grouping (e.g., "clustering") relatively proximate BVP candidates into respective groups (e.g., "clusters"), and selecting one or more BVP candidates from each group (e.g., "cluster") based on cost (e.g., lowest TM cost), a list of BVP candidates may be pruned to a suitable size for an AMVP list or merge list (e.g., a threshold quantity of BVP candidates) while preserving relative diversity between the BVP candidates included in the final list of BVP candidates. Preserving BVP candidate diversity may preserve diversity between the predictions for the BV thereby improving the prediction of the BV. Preserving BVP candidate diversity may also decrease signaling overhead by increasing the likelihood that a candidate BVP will be relatively close to the optimal reference block and thus avoiding relatively large BVDs. These and other features of the present disclosure are described further below.

Figure 18A:
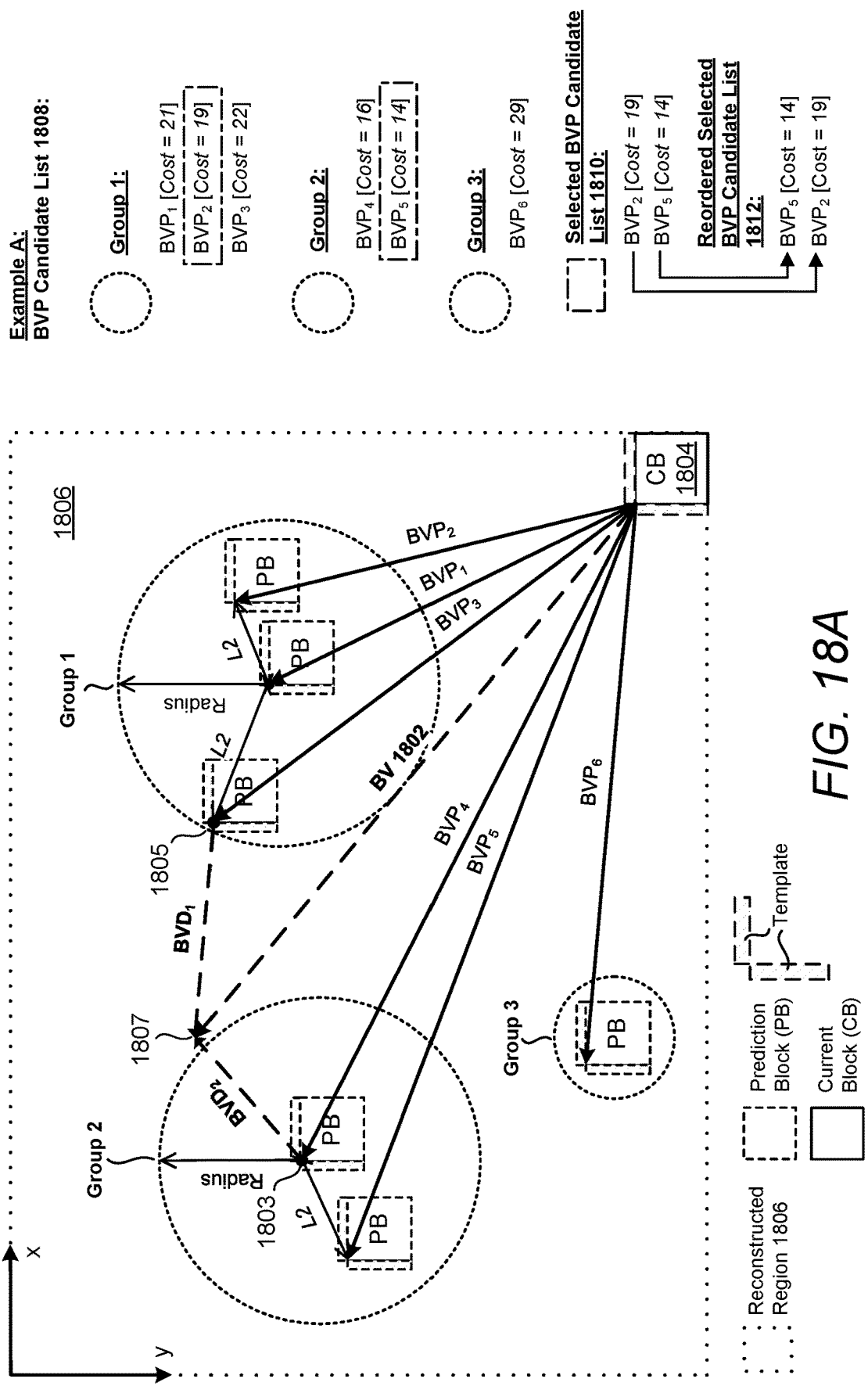
FIG. 18A shows an example of diversifying BVP candidate selection.

FIG. 18A shows an example of diversifying BVP candidate selection. BVP candidates may be selected for a merge list or an AMVP list as described herein.

A block vector (BV) for a current block (CB) may be predictively coded based on one or more block vector predictor (BVP) candidates within a reconstructed region of a picture. In FIG. 18A, for example, a BV 1802 for a CB 1804 may be predictively coded based on one or more BVP candidates within a reconstructed region 1806. In FIG. 18A, example BVP candidates are denoted as $BVP_1$, $BVP_2$, $BVP_3$, $BVP_4$, $BVP_5$, and $BVP_6$. The BV 1802 indicates the actual block vector data that is predicted using a selected BVP candidate. In FIG. 18A, a dotted line is used to denote the BV 1802 for indicating that the BV 1802 is predicted using a BVP candidate.

A block vector difference (BVD) may indicate a displacement from a location within a reconstructed region to a BV. The displacement between the location and a BV may be a displacement between the location and an endpoint of the BV. In FIG. 18A, two BVDs are shown by way of example, $BVD_1$ and $BVD_2$. In FIG. 18A, the $BVD_1$ and the $BVD_2$ indicate respective displacements from two example locations 1803 and 1805 in the reconstructed region 1806 to an endpoint 1807 of the BV 1802, for example, location 1803 for the $BVD_1$ and location 1805 for the $BVD_2$. In FIG. 18A, the example displacement indicated by the $BVD_2$ is smaller than the example displacement indicated by the $BVD_1$. In FIG. 18A, a dotted line is used to denote the $BVD_1$ and the $BVD_2$ for indicating that one or more displacements may not be considered for BVP candidate selection. It should be appreciated that not all BVDs are shown in FIG. 18A and that additional and/or alternative BVDs may indicate displacement between an endpoint of a BV (e.g., BV 1802) and other locations within the reconstructed region.

Both an encoder (e.g., the encoder 114 as shown in FIG. 1 or the encoder 200 as shown in FIG. 2) and a decoder (e.g., the decoder 120 as shown in FIG. 1 or the decoder 300 as shown in FIG. 3) may construct, generate, create, or otherwise determine a BVP candidate list. An example BVP candidate list 1808 is shown in FIG. 18A. The example BVP candidate list 1808 may comprise one or more BVP candidates (e.g., $BVP_1$, $BVP_2$, $BVP_3$, $BVP_4$, BVPs, and/or $BVP_6$). In various examples, one or more BVP candidates may be grouped (e.g., clustered) into one or more groups (e.g., clusters). A cluster of BVP candidates may include BVP candidates that are in close proximity to each other in a reconstructed region of a picture. BVP candidates may be in close proximity to each other based on a distance between the BVP candidates being less than a threshold distance. The distance between BVP candidates may be the distance between the respective endpoints of the BVP candidates. The threshold distance may be the same for each group of BVPs. The threshold distance may be different for different groups of BVPs. One threshold distance (e.g., a relatively longer threshold distance) may be used, for example, for a one group of BVPs while another, different threshold distance (e.g., a relatively shorter threshold distance) may be used for another, different group of BVPs. The threshold may be increased each time a new BVP candidate group is determined. The first BVP candidate group (e.g., the BVP candidate group that is expected to include the BVPs that best predict a BV), for example, may use the lowest threshold, the second BVP candidate group may use a higher threshold, and so forth. The threshold distance used for a group of BVPs may be based on a BVP type of one or more BVPs of the group.

In FIG. 18A, three groups (e.g., clusters) of BVPs are shown. In FIG. 18A, example Group 1 comprises $BVP_1$, $BVP_2$, and $BVP_3$; Group 2 comprises $BVP_4$ and BVPs; and Group 3 comprises $BVP_6$. The manner of determining the example groups (e.g., Groups 1-3) shown in FIG. 18A is discussed below with reference to FIG. 18B.

A cost of a BVP candidate may be obtained, generated, calculated, or otherwise determined. In FIG. 18A, an example cost for each BVP candidate in BVP candidate list 1808 has been determined (e.g., $BVP_1$ cost=21, $BVP_2$ cost=19, $BVP_3$ cost=22, $BVP_4$ cost=16, $BVP_5$ cost=14, and $BVP_6$ cost=29). The example costs shown in FIG. 18A and referenced herein are simplified to a single numerical value for purposes of illustration and convenience. In some examples, a respective cost may not be obtained, generated, calculated, or otherwise determined for every available BVP candidate. In some examples, a respective cost may be obtained, generated, calculated, or otherwise determined for every available BVP candidate. In some examples a respective cost may be obtained, generated, calculated, or otherwise determined for one or more BVP candidates of the available BVP candidates. A cost of a BVP candidate may be based on a template matching (TM) cost. In various examples described herein, a BVP candidate within each group (e.g., cluster) may be selected (e.g., for a refined list of BVP candidates or a final list of BVP candidates) based on having the lowest (e.g., smallest) cost compared to the other BVP candidates of the group (e.g., cluster). In FIG. 18A, the $BVP_2$ in example Group 1 has the lowest cost (19) compared to the costs of the other BVPs in the group, for example, the $BVP_1$ (21) and the $BVP_3$ (22). In example Group 2 of FIG. 18A, the $BVP_5$ has the lowest cost (14) compared to the cost of the other BVP candidate in the group, for example, $BVP_4$ (16). In example Group 3, the $BVP_6$ is the only BVP candidate of the group with a cost of (29). In some examples, the lowest (e.g., smallest) TM cost may correspond to the best (e.g., closest) match of a PB template to the CB template. It should be appreciated that the TM cost corresponding to the best match of a PB template to the CB template may be implemented or determined in a variety of ways (e.g., by the smallest numerical value, the greatest numerical value, and the like).

One or more BVP candidates may be selected for a refined list of BVP candidates or a final list of BVP candidates. The refined list of BVP candidates or the final list of BVP candidates may be or may be used to construct, generate, obtain, or otherwise determine a merge list or an AMVP list. In some examples, a merge list may include a total of six (6) selected BVP candidates. In some examples, an AMVP list may include a total of two (2) selected BVP candidates. In some examples, a merge list and/or an AMVP list may include more or fewer selected BVP candidates. An encoder and/or decoder may select, for example, two (2) BVP candidates for an AMVP list. An encoder and/or decoder may select, for example, six (6) BVP candidates for a merge list. In some examples, an encoder and/or decoder may select more or fewer BVP candidates, for example, for a merge list or an AMVP list. In FIG. 18A, an example selected BVP candidate list 1810 is shown. The example selected BVP candidate list 1810 includes two selected BVP candidates (e.g., $BVP_5$ and $BVP_2$). $BVP_2$ may be selected for the selected BVP candidate list 1810 based on having the lowest cost (e.g., $BVP_2$ cost=19) of the BVP candidates of Group 1 (e.g., $BVP_1$ cost=21 and $BVP_3$ cost=22). Similarly, $BVP_5$ may be selected for the selected BVP candidate list 1810 based on having the lowest cost (e.g., $BVP_5$ cost=14) of the BVP candidates of Group 2 (e.g., $BVP_4$ cost=16). In FIG. 18A, the cost of $BVP_6$ (e.g., $BVP_6$ cost=29), which is the only BVP candidate of Group 3, may be compared to respective costs of $BVP_2$ and $BVP_5$ and eliminated from further consideration due to $BVP_6$ having a higher cost than $BVP_2$ (e.g., $BVP_2$ cost=19) and $BVP_5$ (e.g., $BVP_5$ cost=14), respectively. The example selected BVP candidate list 1810 shown in FIG. 18A thus includes $BVP_2$ (cost=19) and $BVP_5$ (cost=14). If the $BVP_6$ had a lower cost (e.g., cost=11) than one of the selected BVP candidates in the selected BVP candidate list, for example, $BVP_2$, which has the highest cost (e.g., $BVP_6$ cost=19) of the selected BVP candidate list 1810. In some examples, the encoder and/or the decoder may order (or reorder) the selected BVP candidate list 1810 to construct, generate, obtain, or otherwise determine a reordered selected BVP candidate list 1812, with $BVP_5$ (cost=14) being listed as the first selected BVP candidate and $BVP_2$ (cost=19) being listed as the second selected BVP candidate. The ordered (or reordered) selected BVP candidate list 1812 may be used, for example, as an AMVP list having a total of two (2) selected BVP candidates e.g., size=2. In some examples, an ordered (or reordered) selected BVP candidate list may have more selected BVP candidates and may be used, for example, as a merge list having a total of six (6) selected BVP candidates (e.g., size=6). Ordering (or reordering) the selected BVP candidate list may enable the encoder and/or decoder to efficiently identify which BVP candidate in the list is associated with the lowest cost.

Grouping and evaluation of BVP candidates may terminate based on a list of BVP candidates reaching a threshold quantity of BVP candidates. Some available BVP candidates, for example, may not be grouped or evaluated for inclusion in a list of BVP candidates. Grouping and evaluation of BVP candidates may not terminate until all available BVP candidates have been grouped and evaluated for inclusion in a list of BVP candidates.

A lowest cost associated with each BVP candidate group may be determined. The lowest cost associated with a BVP candidate group may be the lowest cost associated with a BVP candidate of the BVP candidate group. BVP candidate groups may be ordered (or reordered) based on the lowest costs respectively associated with the BVP candidate groups. BVP candidate groups, for example, may be ordered (or reordered) based on a subsequently determined BVP candidate group (e.g., a BVP candidate group associated with a lower priority and/or a higher group index) being associated with a lower cost compared to a previously determined BVP candidate group (e.g., a BVP candidate group associated with a higher priority and/or a lower group index), and a BVP candidate from the subsequently determined BVP candidate group may be selected for inclusion in a list of BVP candidates before any BVP candidate from the previously determined BVP candidate group.

Figure 18B:
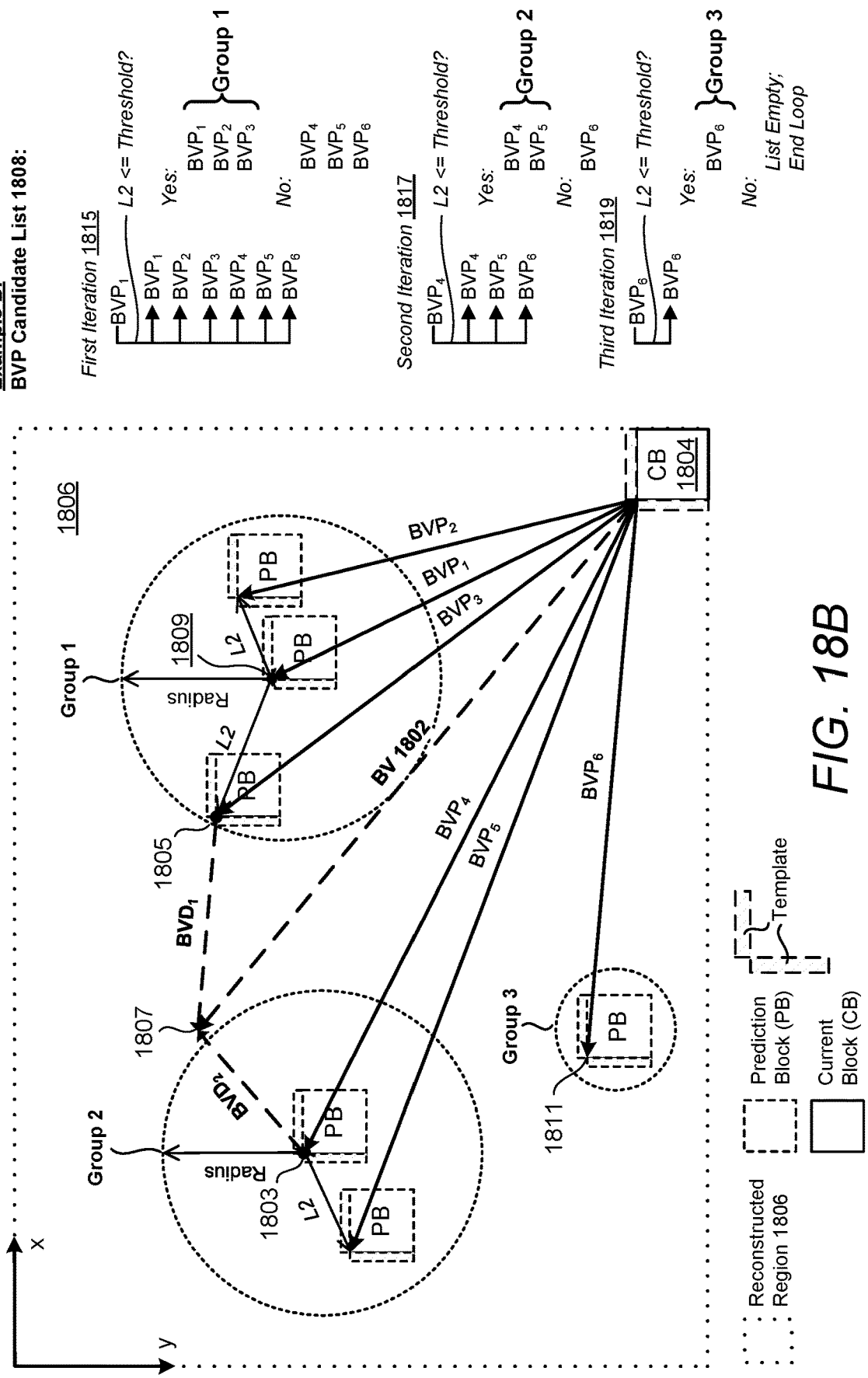
FIG. 18B shows an example of determining one or more groups of BVP candidates.

FIG. 18B shows an example of determining one or more groups (e.g., clusters) of BVP candidates. Groups (e.g., clusters) of BVP candidates may be determined for a merge list or an AMVP list as described herein.

As set forth above with reference to FIG. 18A, a block vector (BV) for a current block (CB) may be predictively coded based on one or more block vector predictor (BVP) candidates within a reconstructed region of a picture. In FIG. 18B, a BV 1802 for a CB 1804 may be predictively coded based on one or more BVP candidates within a reconstructed region 1806. In FIG. 18B, example BVP candidates are denoted as $BVP_1$, $BVP_2$, $BVP_3$, $BVP_4$, $BVP_5$, and $BVP_6$. Each BVP candidate indicates a displacement from the CB 1804 to a location in a reconstructed region 1806. The location indicated by a BVP candidate may correspond to a corner (e.g., a top-left corner) of a PB. In FIG. 18B, for example, an endpoint of $BVP_4$ indicates a location 1803 corresponding to a top-left corner of a PB in Group 2. The BV 1802 indicates the actual block vector data that is predicted using a selected BVP candidate. Similar to FIG. 18A, in FIG. 18A, a dotted line is used to denote the BV 1802 for indicating that the BV 1802 is predicted using a BVP candidate.

As described herein with reference to FIG. 18A, $BVD_1$ and $BVD_2$ in FIG. 18B indicate respective displacements from two example locations 1803 and 1805 in reconstructed region 1806 to an endpoint 1807 of the BV 1802, for example, location 1803 for the $BVD_1$ and location 1805 for the $BVD_2$. In FIG. 18B, the example displacement indicated by the $BVD_2$ is smaller than the example displacement indicated by the $BVD_1$. In FIG. 18A, a dotted line is used to denote the $BVD_1$ and the $BVD_2$ for indicating that, in various examples, one or more displacements may not be considered for BVP candidate selection.

As described herein with reference to FIG. 18A, both an encoder (e.g., the encoder 114 as shown in FIG. 1 or the encoder 200 as shown in FIG. 2) and a decoder (e.g., the decoder 120 as shown in FIG. 1 or the decoder 300 as shown in FIG. 3) may construct, generate, create, or otherwise determine a BVP candidate list. The example BVP candidate list 1808 is shown in FIG. 18A is also shown in FIG. 18B. The example BVP candidate list 1808 may comprise one or more BVP candidates (e.g., $BVP_1$, $BVP_2$, $BVP_3$, $BVP_4$, $BVP_5$, and/or $BVP_6$). In various examples, the one or more BVP candidates may be grouped (e.g., clustered) into one or more groups (e.g., clusters).

Determining a final list of BVP candidates may include grouping (e.g., clustering) the BVP candidates into one or more groups (e.g., clusters) and selecting a BVP candidate from one or more of the determined groups (e.g., Groups 1-3 as shown in FIG. 18B) to include in the final list of BVP candidates. A group of BVP candidates (e.g., a cluster of BVP candidates) may be referred to, and is referred to herein for convenience, as a BVP candidate group (e.g., a BVP candidate cluster). The BVP candidates of a BVP candidate group may be referred to, and are referred to herein for convenience, as grouped BVP candidates (e.g., clustered BVP candidates). A BVP candidate may belong to a BVP candidate group based on, for example, the BVP candidate and another BVP candidate being within a threshold distance of each other (e.g., a distance between the BVP candidates being less than or less than or equal to the threshold distance). The distance between BVP candidates may be measured from the respective endpoints of the BVP candidates. A BVP candidate may belong to a BVP candidate group, for example, based on the distance between the respective endpoints of two BVP candidates. BVP candidates may belong to (e.g., included in, added to, inserted into, selected for, associated with) a BVP candidate group based on their respective endpoints being within a threshold distance of each other. One or more BVP candidate groups may be determined for BVP candidates.

Various implementations may be used to determine the BVP candidate groups and select a BVP candidate from the BVP candidate groups for determining a final list of BVP candidates. Determining the one or more BVP candidate groups, for example, may include iterating over the available BVP candidates in for grouping (e.g., clustering) the available BVP candidates. The one or more BVP candidate groups determined may include one or more of the available BVP candidates. As described herein, determining the one or more BVP candidate groups may include determining that a BVP candidate in a BVP candidate group is within a threshold distance of another BVP candidate of the available BVP candidates. A BVP candidate group may include, for example, at least one BVP candidate of the available BVP candidates. A BVP candidate group may include, for example, multiple BVP candidates of the available BVP candidates. A BVP candidate group may include, for example, all available BVP candidates. Determining the final list of BVP candidates may include determining, for each BVP candidate group, which BVP candidate of the BVP candidate group is associated with the lowest cost (e.g., template matching cost). A BVP candidate may be selected to be included in the final list of BVP candidates based on that BVP candidate having the lowest cost. The final list of BVP candidates may include, for example, only one BVP candidate from any BVP candidate group of the one or more BVP candidate groups. The final list of BVP candidates may include, for example, more than one BVP candidate from a BVP candidate group. The final list of BVP candidates may include, for example, one BVP candidate from each BVP candidate group. The final list of BVP candidates may not include (e.g., exclude), for example, any BVP candidate from one or more of the BVP candidate groups. For example, if a BVP candidate is associated with a cost that meets (e.g., equals or exceeds) a cost threshold, that BVP candidate may not be included in the final list of BVP candidates (e.g., not added to the final list of BVP candidates or dropped from the list of final BVP candidates if previously included).

Various approaches may be used to implement the selection procedure. The selection procedure may, for example, iterate over the available BVP candidates to determine (e.g., construct, generate, obtain) the BVP candidate groups and which available BVP candidates are included in each group. In some examples, the selection procedure may continue until a BVP candidate group has been determined for all available BVP candidates. In some example, the selection procedure may end before a BVP candidate group has been determined for all available BVP candidates. The selection procedure may end, for example, upon selecting a sufficient number of BVP candidates (e.g., two BVP candidates) for a final list of BVP candidates (e.g., an AMVP list having only two BVP candidates) even if a BVP candidate group has not yet been determined for all available BVP candidates. In some examples, BVP candidate groups may be logical BVP candidate groups (e.g., logical clusters of BVP candidates that are within a threshold distance of a given BVP candidate). Other criteria may be used to determine the BVP candidate groups (e.g., BVP candidates that are within a threshold distance of a predetermined location within a reconstructed region; BVP candidates that are located within predefined area of the reconstructed region such as, for example, a cell of a grid corresponding to a reconstructed region; BVP candidates that are within a threshold distance of a median location of multiple BVPs; a candidate in an IBC list such as an IBC candidate (IBC-BV), e.g., a candidate that uses a horizontal or vertical reconstructed reordering (RR-IBC-BV) or a template matching prediction (TMP) candidate (TMP-BV) of neighboring blocks). In some examples, the selection procedure may store (e.g., using one or more in-memory data structures) data indicating which BVP candidates belong to which BVP candidate groups. In some examples, the selection procedure may determine the BVP candidate groupings before determining which BVP candidate in each BVP candidate grouping is associated with the lowest cost (e.g., the lowest template matching cost). In some example, the selection procedure may determine which BVP candidate in a BVP candidate grouping is associated with the lowest cost (e.g., the lowest template matching cost) before determining a subsequent BVP candidate grouping.

In some examples, the list of BVP candidates (e.g., BVP candidate list 1808 in FIG. 18), may be ordered based on BVP candidate type as described herein with reference to FIGS. 17A-B. For example, a list of BVP candidates may be ordered such that any spatial candidates are listed first, followed by any temporal candidates, followed by any HMVP candidates, followed by any pairwise candidates, followed by any zero-padding candidates. Certain types of BVP candidates may result in better predictions of a BV as compared to other types of BVP candidates. Spatial candidates, for example, may better predict a BV as compared to temporal candidates. Temporal candidates, for example, may better predict a BV as compared to HMVP candidates. HMVP candidates, for example, may better predict a BV as compared to zero-padding candidates. Ordering a list of BVP candidates by type (e.g., based on their predictive capabilities) before a selection procedure, therefore, may result in a final list of BVP candidates that is both diverse and includes the BVP candidates that are likely the best predictors of a BV. A list of BVP candidates may be ordered based on criteria other than or in addition to BVP candidate type.

BVP candidates may be grouped (e.g., clustered) as described herein. FIG. 18B shows an example of determining one or more groups (e.g., clusters) for the BVP candidates in the BVP candidate list 1808. One or more iterations (e.g., iteration 1815, iteration 1817, and iteration 1819 in FIG. 18B) may be performed, for example, for determining the one or more groups. At an iteration, a BVP candidate may be evaluated, for example, for determining whether the BVP candidate should be included in a group of BVP candidates. To begin, an initial BVP candidate in BVP candidate list 1808 (e.g., the $BVP_1$) may be selected for the first BVP candidate group for an initial iteration 1815. The first BVP candidate group, therefore, may include at least the initially selected BVP candidate. A respective distance between the initially selected BVP candidate (e.g., the $BVP_1$) and each of the BVP candidates in the BVP candidate list 1808 may be calculated to determine whether the BVP candidates in the BVP candidate list are within a threshold distance of the initially selected BVP candidate (e.g., whether the distance is less than or equal to the threshold distance). The distance between BVP candidates may be, for example, a Euclidean (or L2) distance between an endpoint of the initially selected BVP candidate (e.g., the $BVP_1$) and an endpoint of a BVP candidate in the BVP candidate list 1808.

In various examples, the threshold distance may correspond to a value of a radius, represented in units of pixels, of a circle that is centered at the endpoint of the initially selected BVP (e.g., $BVP_1$) as seen in FIG. 18B at example location 1809 in the reconstructed region 1806. A BVP candidate group may thus correspond to a circle, centered at an endpoint of a BVP candidate (e.g., $BVP_1$), that is defined by a radius and that indicates an area of a reconstructed region of a picture (e.g., the reconstructed region 1806). Each BVP candidate that is determined as belonging to the BVP candidate group (e.g., Group 1) has an end point located within the circle. The distance between the endpoint at the center of the circle and another BVP belonging to the BVP candidate group, therefore, is less than or equal to the radius of the circle. In various examples, the threshold distance (e.g., the radius value) may include integer values and fractional values, for example, ⅛, ¼, ½, 1, 2, 3, 4, 5, 6, 7, 8, 12, 16, 20, 24, 28, 32, 36, 40, 44, 48, 52, 56, 60, 64. Integer precision for the threshold distance (e.g., the radius value) may be used (e.g., 20, 32, etc.). Non-integer (fractional) precision for the threshold distance (e.g., radius value) may be used (e.g., 20.5, 32.25, etc.). In some examples, the size of the radius may be selected based on a percentage of the bitrate that can be maintained while maintaining a desired quality of the video (e.g., the same or substantially the same quality). In some examples, the value of the radius may be calculated as radius=$\log_2$ ((cbWidth× cbHeight)>>MIN_PU_SIZE), where cbWidth is the width of the current block (CB), cbHeight is the height of the CB, >> is the bitwise right shift operator, and MIN_PU_SIZE is the minimum prediction unit size for the picture. The threshold distance between BVP candidates thus may correspond to a ratio between an area of a current block and a size of a pixel unit. A constant radius value that is not dependent on block size (non-block size dependent) may be used. The radius may be determined based on the cost (e.g., template matching costs) respectively determined for the BVP candidates in the list of BVP candidates, for example, the minimum cost (e.g., minimum template matching cost), the maximum cost (e.g., maximum template matching cost), and/or the average cost (e.g. the average template matching cost). The radius value may be based on the quantity of BVP candidates in the list of BVP candidates.

If the distance between endpoints is less than or equal to a threshold distance (including, e.g., a distance=0 if a BVP candidate is compared to itself), then a BVP candidate may be determined as belonging to a BVP candidate group. In FIG. 18B, for example, the $BVP_1$, the $BVP_2$, and the $BVP_3$ each have endpoints that are at a distance less than or equal to the threshold distance (e.g., the radius of the circle corresponding to Group 1). The $BVP_1$, the $BVP_2$, and the $BVP_3$ in this example, therefore, are determined as belonging to Group 1 (e.g., included in, added to, inserted into, selected for, associated with) Group 1. BVP candidates determined as belonging to a BVP candidate group may be removed from consideration for subsequent iterations (e.g., by removing them from a BVP candidate list) Based on determining that each of the $BVP_1$, the $BVP_2$, and the $BVP_3$ belong to Group 1, for example, each of the $BVP_1$, the $BVP_2$, and the $BVP_3$ may be removed from the BVP candidate list 1808. BVP candidates not determined as belonging to a BVP candidate group may be located beyond a threshold distance of an endpoint centered at the circle corresponding to the BVP candidate group. As seen in FIG. 18B, for example, each of the respective distances between the endpoint centered at the circle corresponding to Group 1 and the endpoints of the $BVP_4$, the $BVP_5$, and the $BVP_6$ are greater than the threshold distance (e.g., the radius of the circle corresponding to Group 1), and therefore these BVP candidates are not determined as belonging to Group 1 and thus remain in BVP candidate list 1808 for further evaluation at a subsequent iteration.

For the next iteration (e.g., iteration 1817), a remaining BVP candidate in the BVP candidate list 1808 may be selected. The BVP candidate selected for a subsequent iteration may be the first remaining BVP candidate in the BVP candidate list 1808 (e.g., the $BVP_4$ for iteration 1817). A subsequent BVP candidate group therefore, may include at least the selected remaining BVP candidate. A respective distance between the selected remaining BVP candidate (e.g., the $BVP_4$) and each of the remaining BVP candidates in the BVP candidate list 1808 may be calculated to determine whether any remaining BVP candidates in the BVP candidate list 1808 is within the threshold distance of the selected remaining BVP candidate (e.g., whether the distance is less than or equal to the threshold distance). The distance between BVP candidates may be, for example, a Euclidean (or L2) distance between an endpoint of the selected remaining BVP candidate (e.g., the $BVP_4$) and an endpoint of a remaining BVP candidate in the BVP candidate list 1808.

As described herein if the distance between endpoints is less than or equal to a threshold distance (including, e.g., a distance=0 if a BVP candidate is compared to itself), then a BVP candidate may be determined as belonging to a subsequent BVP candidate group. In FIG. 18B, for example, the $BVP_4$ and the $BVP_5$ each have endpoints that are at a distance less than or equal to the threshold distance (e.g., the radius of a circle corresponding to Group 2), The $BVP_4$ and the $BVP_5$ in this example, therefore, are determined as belonging to Group 2 (e.g., included in, added to, inserted into, selected for, associated with) Group 2. Based on determining that each of the $BVP_4$ and the $BVP_5$ belong to Group 2, for example, each of the $BVP_4$ and the $BVP_5$ may be removed from the BVP candidate list 1808. As seen in FIG. 18B, for example, the distance between the endpoint centered at the circle corresponding to Group 2 and the endpoint of $BVP_6$ is greater than the threshold distance (e.g., the radius of the circle corresponding to Group 2), and therefore this BVP candidate is not determined as belonging to Group 2 and thus remains in the BVP candidate list 1808 for further evaluation at a subsequent iteration.

For the next iteration (e.g., iteration 1819), a remaining BVP candidate in the BVP candidate list 1808 may be selected. As described herein, the BVP candidate selected for the subsequent iteration may be the first remaining BVP candidate in the BVP candidate list 1808 (e.g., the $BVP_6$ for iteration 1819). A respective distance between the selected remaining BVP candidate (e.g., the $BVP_6$) and each of the remaining BVP candidates in the BVP candidate list 1808 may be calculated to determine whether any remaining BVP candidates in the BVP candidate list 1808 is within the threshold distance of the selected remaining BVP candidate (e.g., whether the distance is less than or equal to the threshold distance). The distance between BVP candidates may be, for example, a Euclidean (or L2) distance between an endpoint of the selected remaining BVP candidate (e.g., the $BVP_6$) and an endpoint of a remaining BVP candidate in the BVP candidate list 1808. As seen in FIG. 18B, in this example, the $BVP_6$ is the only remaining BVP candidate in the BVP candidate list 1808, and consequently the distance between the BVP₆ and itself is zero (0), which still meets the criteria of the distance being within (e.g., less than or equal to) the threshold distance (e.g., the radius of a circle corresponding to Group 3). The BVP₆ in this example, therefore, is determined as belonging to Group 3. Based on determining that the BVP₆ belongs to Group 3, for example, the BVP₆ may be removed from the BVP candidate list 1808. Iteration over a BVP candidate list may end based on the BVP candidate list being empty with no remaining BVP candidates to evaluate. As seen in FIG. 18B, the iterations may end based on determining that the BVP₆ belongs to Group 3 and removing the BVP₆ from the BVP candidate list 1808. In FIG. 18A and FIG. 18B, for the sake of not overcomplicating the drawings, the circle corresponding to Group 3 is illustrated as smaller than the respective circles for Group 1 and Group 2. The circle corresponding to Group 3, in this example, should be understood as having the same radius (corresponding to the same threshold distances) and thus the same dimensions as the other circles respectively corresponding to the other BVP candidate groups.

It should be appreciated that the operations described herein regarding the determination of one or more BVP candidate groups (e.g., BVP candidate clusters) (e.g., for a merge list or an AMVP list are illustrated by example and not by limitation. BVP candidates (or indications of BVP candidates) may be stored, for example, in data structures other than a list (e.g., an array). In some examples, instead of dynamically adding or removing BVP candidates from a list, other data structures may be used to perform the operations described herein including, for example, determine one or more BVP candidate groups, determining which BVP candidates belong to a determined BVP candidate group, and/or determining which BVP candidate of a BVP candidate group is associated with the lowest cost (e.g., a template matching cost) of any BVP candidate of the BVP candidate group. Additional examples are discussed herein.

The following pseudocode provides one example implementation of operations described herein. Additional and alternative implementations may be used to determine which BVP candidates to include in a final list of BVP candidates (e.g., for a merge list or an AMVP list) based on a distance between the BVP candidates as described herein.

```
inline void PU::clusterBvpCand(const int cbWidth, const int cbHeight,
AMVPInfo *pInfo) {
    // Number of cluster initialization
    int numGroups = 0;
    // array to tag which BVPs are selected for a cluster
    std::array<bool, (REGULAR_AMVP_MAX_NUM_CANDS + 1)> validCand;
    // BVPs are initially labeled as available
    validCand.fill(true);
    // variable to store the best BVP for a cluster
    Mv bestCand;
    // variable to store the cost of the best BVP
    Distortion bestCost;
    // Radius of the clusters
    int sqrRadius;
    sqrRadius = std::max(2, floorLog2((cbWidth * cbHeight) >>
    MIN_PU_SIZE));
    // Radius is scaled according to the internal BVP resolution in the
    ECM
    sqrRadius = (sqrRadius * sqrRadius) << 8;
    // Clustering of AMVP candidates into two groups
    // Clustering if there are more than 2 BVPs
    if (pInfo->numCand > AMVP_MAX_NUM_CANDS) {
        // Clip the number of candidates to 6
        int numCand = std::min((int) pInfo->numCand,
        REGULAR_AMVP_MAX_NUM_CANDS + 1);
        // test BVB candidates
        for (int i = 0; i < numCand; i++) {
            // If BVP is valid, it is recorded as the best candidate
            if (validCand[i]) {
                // If BVP is valid, it is recorded as the best
                candidate
                bestCand = pInfo->mvCand[i];
                bestCost = pInfo->mvCost[i];
            }
            // If the BVP was already selected by a cluster, jump to
            the next BVP in the for-loop
            else {
                continue;
            }
            // Check the following BVPs
            for (int j = i + 1; j < numCand; j++) {
                // If BVP has not been selected before (valid), BVP
                is checked if belong to current cluster
                if (validCand[j]) {
                    // Difference between the pivot BVP and the
                    checked BVP
                    Mv mvDiff = pInfo->mvCand[i] - pInfo-
                    >mvCand[j];
                    // If the BVP is inside the Radius (L2
                    distance) check the BVP cost
                    if ((mvDiff.getAbsHor( ) * mvDiff.getAbsHor( )
                    + mvDiff.getAbsVer( ) * mvDiff.getAbsVer( ))<=
                    sqrRadius) {
                        // remove the BVP from the list tagging
```

```
                it as invalid
                validCand[j] = false;
                // If the cost is lower than the best
                BVP, it is set as the best BVP in the
                cluster
                if (bestCost > pInfo->mvCost[j]) {
                    bestCand = pInfo->mvCand[j];
                    bestCost = pInfo->mvCost[j];
                }
            }
        }
    }
    // After running the whole list, the best BVP and best
    cost are recorded for the cluster
    pInfo->mvCand[numGroups] = bestCand;
    pInfo->mvCost[numGroups] = bestCost;
    // if two clusters are met, the algorithm ends
    if (++numGroups >= AMVP_MAX_NUM_CANDS) {
        break;
    }
    }
    // if there is only one cluster, the second candidate is set as
    the second BVP
    pInfo->numCand = AMVP_MAX_NUM_CANDS;
    }
}
#endif
```

A distance may be determined between a first selected BVP candidate to each BVP candidate of a plurality of BVP candidates. After determining the distance between the first selected BVP candidate to each BVP candidate of the plurality of BVP candidates, one or more clusters may be determined for the plurality of BVP candidates based on the distances. After determining the one or more clusters for the plurality of BVP candidates based on the distances, a cost may be determined for each BVP candidate of the one or more clusters. After determining the cost for each BVP candidate of the one or more clusters, a BVP candidate may be selected within each cluster based on the costs. Each BVP candidate of the plurality of BVP candidates may indicate a displacement from a Current Block (CB) to a location in a reconstructed region.

Determining one or more clusters may include adding a respective BVP candidate of the plurality of BVP candidates to a first cluster of the one or more clusters based on the distance of the of the respective BVP candidate from the first selected BVP candidate being less than or equal to a threshold. Determining one or more clusters may include determining a distance from a second selected BVP candidate to each BVP candidate of the plurality of BVP candidates not in the first cluster. Determining the one or more clusters may include adding a respective BVP candidate of the plurality of BVP candidates not in the first cluster to a second cluster of the one or more clusters based on the distance of the respective BVP candidate from the second selected BVP candidate being less than or equal to a second threshold.

Determining the one or more clusters may include, for each respective BVP candidate of the plurality of BVP candidates, adding the respective BVP candidate to a first cluster of the one or more clusters based on the distance of the BVP candidate from the first selected BVP candidate being less than or equal to a threshold. Determining the one or more clusters may include determining a distance from a second selected BVP candidate to each BVP candidate of the plurality of BVP candidates not in the first cluster. Determining the one or more clusters may include adding a respective BVP candidate of the plurality of BVP candidates not in the first cluster to a second cluster of the one or more clusters based on the distance of the respective BVP candidate from the second selected BVP candidate being less than or equal to a second threshold.

The threshold may be a radius value, represented in units of pixels, of a circle centered at an end of the first selected BVP, and each candidate in the first cluster may have an end point inside the circle. The second threshold may be a radius value, represented in units of pixels, of a circle centered at an end of the second selected BVP, and each candidate in the second cluster may have an end point inside the circle. The second threshold may be the same as the threshold. The radius value may comprise: $1/8$, $1/4$, $1/2$, 1, 2, 3, 4, 5, 6, 7, 8, 12, 16, 20, 24, 28, 32, 36, 40, 44, 48, 52, 56, 60, and 64.

Determining the cost for each BVP candidate of the one or more clusters may include determining a template matching (TM) cost between a template of a CB and a template of a Prediction Block (PB) displaced from the CB by each BVP candidate. Determining the cost between the template of the CB and the template of the PB displaced from the CB by each BVP candidate may include determining a difference between the template of the PB displaced from the CB by each BVP candidate and the template of the CB. The difference may be a Sum of Absolute Differences (SAD).

Selecting the BVP candidate within each cluster based on the costs may include inserting the selected BVP candidate within each cluster into a merge list or an AMVP list. Selecting the BVP candidate within each cluster based on the costs may include determining an averaged BVP candidate for each cluster based on a weighted average of the BVP candidates within each cluster, wherein the weighted average is based on the TM cost of each of the BVP candidates within each cluster, and inserting the averaged BVP candidate for each cluster into a merge list or an AMVP list. The weighted average may be based on an inverse of the TM cost of each of the BVP candidates within each cluster. Selecting the BVP candidate within each cluster based on the costs may include selecting the BVP candidate with the smallest TM cost of the TM costs of each of the BVP candidates within each cluster.

Selecting the BVP candidate with the smallest TM cost of the TM costs of each of the BVP candidates within each cluster may include determining a subset list comprising each BVP candidate with the smallest TM cost within each cluster. The subset list may be an index to the clusters having a number of the BVP candidates with the smallest TM cost within each of the clusters. The subset list may be a number of the BVP candidates with the smallest TM cost within each of the clusters. Selecting the BVP candidate with the smallest TM cost of the TM costs of each of the BVP candidates within each cluster and determining a subset list comprising each BVP candidate with the smallest TM cost within each cluster may include inserting the subset list into a merge list or an AMVP list. Selecting the BVP candidate with the smallest TM cost of the TM costs of each of the BVP candidates within each cluster and determining a subset list comprising each BVP candidate with the smallest TM cost within each cluster may include reordering the subset list based on the TM cost of each BVP candidate within the subset list. Selecting the BVP candidate with the smallest TM cost of the TM costs of each of the BVP candidates within each cluster, determining a subset list comprising each BVP candidate with the smallest TM cost within each cluster, and reordering the subset list based on the TM cost of each BVP candidate within the subset list may include inserting the reordered subset list into a merge list or an AMVP list.

Figure 19:
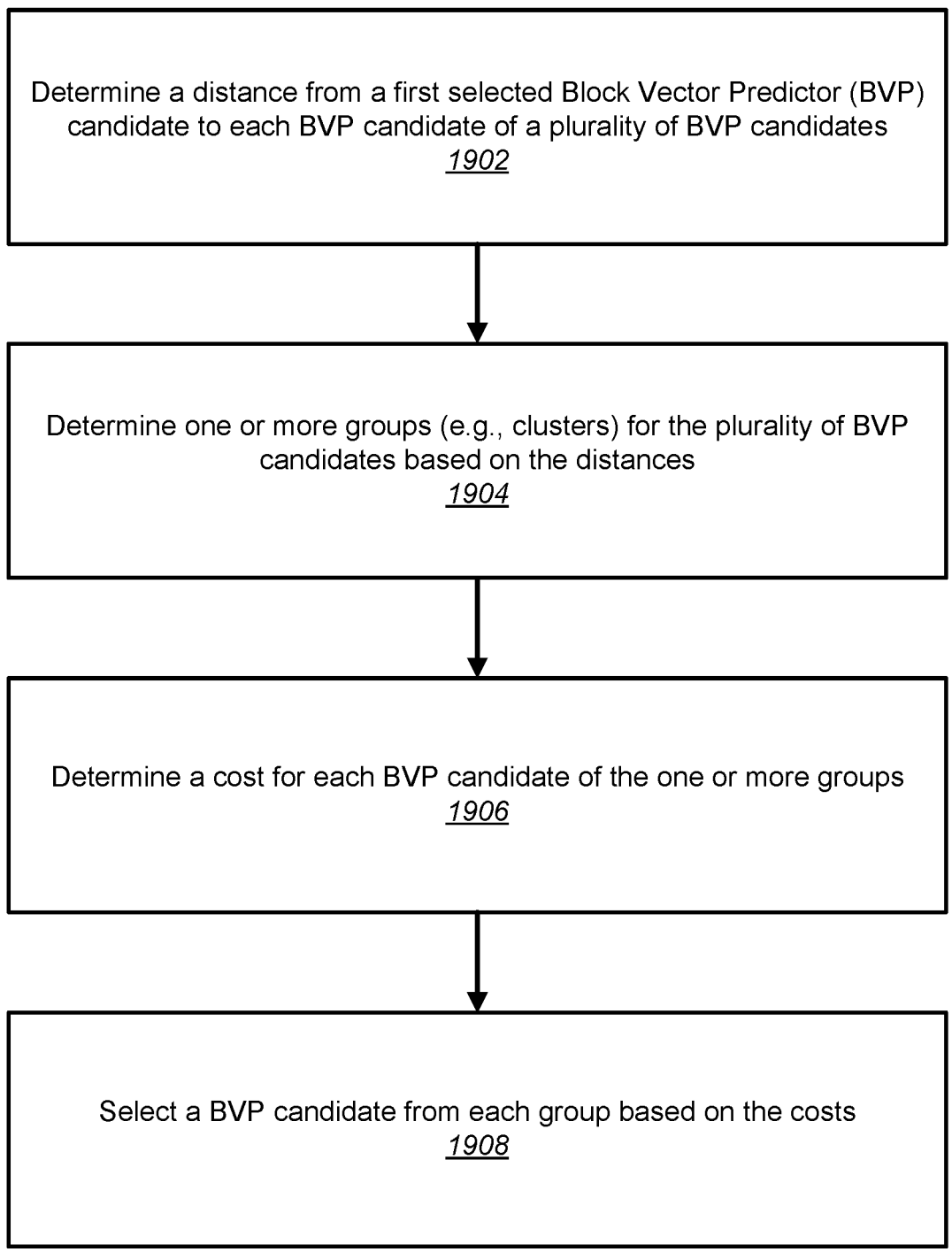
FIG. 19 shows an example method of determining one or more groups of BVP candidates and selecting a BVP candidate from each group.

FIG. 19 shows an example of a method 1900 for determining one or more groups of BVP candidates and selecting a BVP candidate from each group. The example method may be performed by an encoder and/or a decoder. The BVP candidate groups may be determined, and the BVP candidates may be selected from the BVP candidate group, for a merge list or an AMVP list. A method may include, for example, determining a distance from a first selected block vector predictor (BVP) candidate to each BVP candidate of a plurality of BVP candidates, determining one or more groups (e.g., clusters) for the plurality of BVP candidates based on the distances, determining a cost for each BVP candidate of the one or more groups, and selecting a BVP candidate from each group based on the costs, in. The example method 1900 may be implemented by an encoder, such as encoder 114 as shown in FIG. 1 or encoder 200 as shown in FIG. 2, or by a decoder, such as decoder 120 as shown in FIG. 1 or decoder 300 as shown in in FIG. 3.

At step 1902, an encoder or decoder may determine a distance from a first selected BVP candidate to each BVP candidate of a plurality of BVP candidates. Each BVP candidate of the plurality of BVP candidates may indicate a displacement from a Current Block (CB) to a location in a reconstructed region of a picture.

At step 1904, the encoder or decoder may determine one or more groups (e.g., clusters) for the plurality of BVP candidates based on the distances. Determining one or more clusters may include adding a respective BVP candidate of the plurality of BVP candidates to a first group of the one or more groups based on the distance of the of the respective BVP candidate from the first selected BVP candidate being less than or equal to a threshold. Determining one or more groups may include determining a distance from a second selected BVP candidate to each BVP candidate of the plurality of BVP candidates not in the first group. Determining the one or more groups may include adding a respective BVP candidate of the plurality of BVP candidates not in the first group to a second group of the one or more groups based on the distance of the respective BVP candidate from the second selected BVP candidate being less than or equal to a second threshold.

Determining the one or more clusters may include, for each respective BVP candidate of the plurality of BVP candidates, adding the respective BVP candidate to a first group of the one or more groups based on the distance of the BVP candidate from the first selected BVP candidate being less than or equal to a threshold. Determining the one or more clusters may include determining a distance from a second selected BVP candidate to each BVP candidate of the plurality of BVP candidates not in the first group. Determining the one or more group may further include adding a respective BVP candidate of the plurality of BVP candidates not in the first group to a second group of the one or more groups based on the distance of the respective BVP candidate from the second selected BVP candidate being less than or equal to a second threshold.

The threshold may be a radius value, represented in units of pixels, of a circle centered at an end of the first selected BVP, and each BVP candidate in the first group may have an end point inside the circle. The second threshold may be a radius value, represented in units of pixels, of a circle centered at an end of the second selected BVP, and each candidate in the second group may have an end point inside the circle. The second threshold may be the same as the threshold. The radius value may comprise: ⅛, ¼, ½, 1, 2, 3, 4, 5, 6, 7, 8, 12, 16, 20, 24, 28, 32, 36, 40, 44, 48, 52, 56, 60, and 64. In another example, the threshold may be a distance, represented in units of pixels, of a square centered at an end of the first selected BVP, which may be determined by comparing the x- and y-coordinates of the respective locations.

At step 1906, the encoder or the decoder determines a cost for each BVP candidate of the one or more groups. The determining the cost for each BVP candidate of the one or more groups may further include determining a template matching (TM) cost between a template of a CB and a template of a Prediction Block (PB) displaced from the CB by each BVP candidate. The determining the cost between the template of the CB and the template of the PB displaced from the CB by each BVP candidate may further include determining a difference between the template of the PB displaced from the CB by each BVP candidate and the template of the CB. The difference may be a Sum of Absolute Differences (SAD).

At step 1908, the encoder or the decoder may select a BVP candidate from each group based on the costs. The selecting the BVP candidate from each group based on the costs may include inserting the selected BVP candidate within each cluster into a final list of BVP candidates. The final list of BVP candidates may be or otherwise be used to determine a merge list or an AMVP list. The selecting the BVP candidate from each group based on the costs may include determining an averaged BVP candidate for each group based on a weighted average of the BVP candidates of each group The weighted average may be based on the TM cost of each of the BVP candidates of each group The selecting the BVP candidate from each group based on the costs may include inserting the averaged BVP candidate for each group into a merge list or an AMVP list. The weighted average may be based on an inverse of the TM cost of each of the BVP candidates of each group.

The selecting the BVP candidate from each group based on the costs may include selecting the BVP candidate with the lowest (e.g., smallest) TM cost of the TM costs of each of the BVP candidates of each group. The selecting the BVP candidate with the lowest TM cost of the TM costs of each of the BVP candidates of each group may include determining a subset list comprising each BVP candidate with the lowest TM cost of each group. The subset list may be an index to the groups having a number of the BVP candidates with the lowest TM cost of each of the groups. The subset list may be a quantity of the BVP candidates with the lowest TM cost of each of the groups.

The selecting the BVP candidate with the lowest TM cost of the TM costs of each of the BVP candidates of each group and determining a subset list comprising each BVP candidate with the lowest TM cost of each group may include inserting the subset list into a merge list or an AMVP list. The selecting the BVP candidate with the lowest TM cost of the TM costs of each of the BVP candidates of each group and determining a subset list comprising each BVP candidate with the lowest TM cost of each group may include reordering the subset list based on the TM cost of each BVP candidate within the subset list. The selecting the BVP candidate with the lowest TM cost of the TM costs of each of the BVP candidates of each group, determining a subset list comprising each BVP candidate with the lowest TM cost of each group, and reordering the subset list based on the TM cost of each BVP candidate within the subset list may include inserting the reordered subset list into a merge list or an AMVP list.

The disclosures herein regarding diversifying BVP candidate selection for a merge list or an AMVP list is presented in the context of block vectors (BVs), block vector predictor (BVP) candidates, and block vector differences (BVDs), the disclosures described herein may be used with other prediction modes, such as inter prediction, including advanced motion vector prediction (AMVP) and inter prediction block merging. The disclosures herein regarding block vectors (BVs), block vector predictors (BVPs), and block vector differences (BVDs) may be similarly respectively used, for example, with motion vectors (MVs), motion vector predictor (MVP) candidates, and motion vector differences (MVDs). The disclosures herein regarding determining one or more groups (e.g., clusters) of BVP candidates may be implemented using any suitable means for identifying groups of BVP candidates such as groups of BVP candidates that are located near each other (e.g., within a threshold distance of each other). For example, alternative grouping (e.g., clustering) methods may be used such as centroid-based clustering (e.g., K-means clustering or variations thereof), density-based clustering, distribution-based clustering, hierarchical-based clustering, spectral clustering, affinity propagation, mean shift clustering, and the like.

Figure 20:
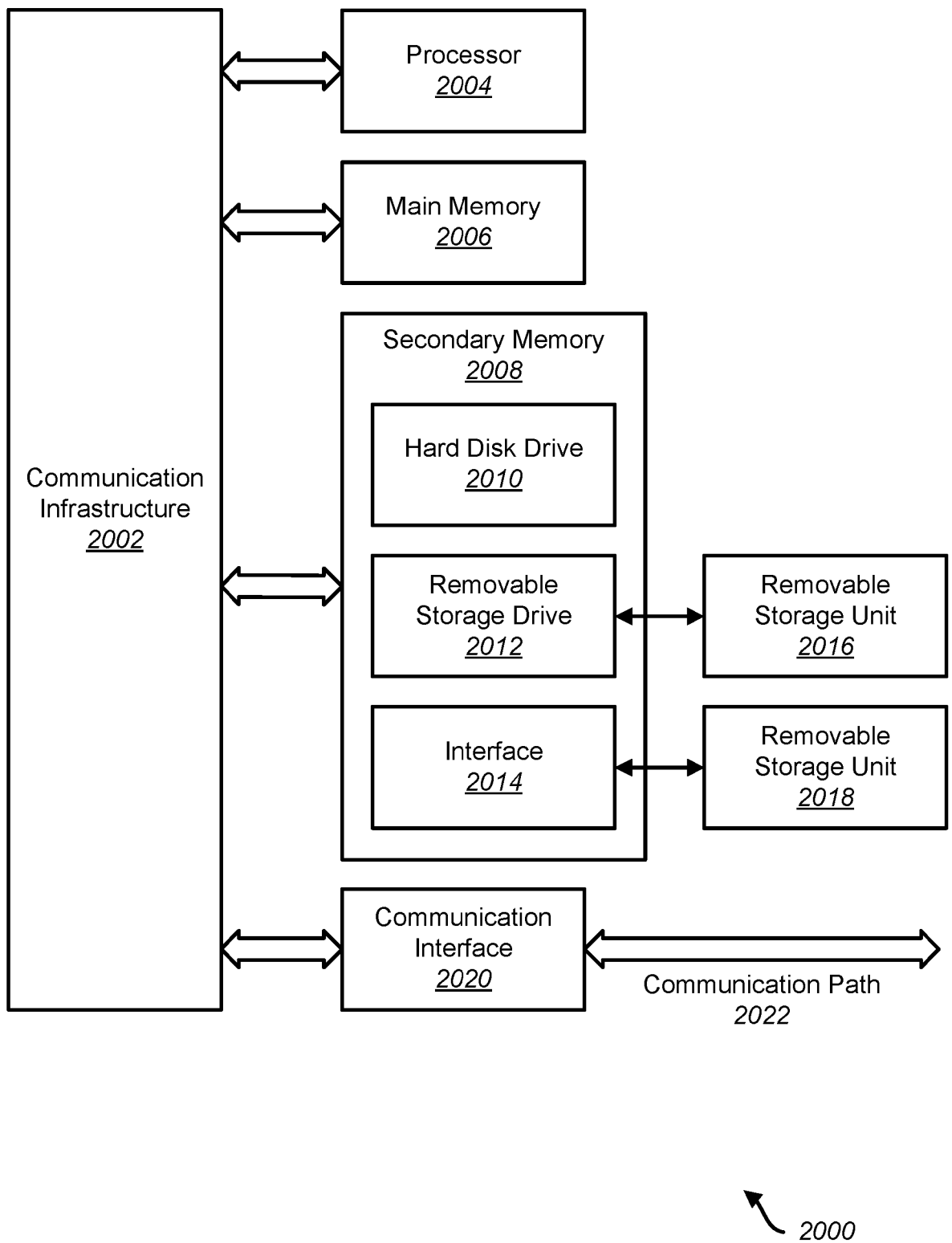
FIG. 20 shows an example computer system in which examples of the present disclosure may be implemented.

FIG. 20 shows an example computer system in which examples of the present disclosure may be implemented. For example, the example computer system 2000 shown in FIG. 20 may implement one or more of the methods described herein. For example, various devices and/or systems described herein (e.g., in FIGS. 1, 2, and 3) may be implemented in the form of one or more computer systems 2000. Furthermore, each of the steps of the flowcharts depicted in this disclosure may be implemented on one or more computer systems 2000.

The computer system 2000 may comprise one or more processors, such as a processor 2004. The processor 2004 may be a special purpose processor, a general purpose processor, a microprocessor, and/or a digital signal processor. The processor 2004 may be connected to a communication infrastructure 2002 (for example, a bus or network). The computer system 2000 may also comprise a main memory 2006 (e.g., a random access memory (RAM)), and/or a secondary memory 2008.

The secondary memory 2008 may comprise a hard disk drive 2010 and/or a removable storage drive 2012 (e.g., a magnetic tape drive, an optical disk drive, and/or the like). The removable storage drive 2012 may read from and/or write to a removable storage unit 2016. The removable storage unit 2016 may comprise a magnetic tape, optical disk, and/or the like. The removable storage unit 2016 may be read by and/or may be written to the removable storage drive 2012. The removable storage unit 2016 may comprise a computer usable storage medium having stored therein computer software and/or data.

The secondary memory 2008 may comprise other similar means for allowing computer programs or other instructions to be loaded into the computer system 2000. Such means may include a removable storage unit 2018 and/or an interface 2014. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2018 and interfaces 2014 which may allow software and/or data to be transferred from the removable storage unit 2018 to the computer system 2000.

The computer system 2000 may also comprise a communications interface 2020. The communications interface 2020 may allow software and data to be transferred between the computer system 2000 and external devices. Examples of the communications interface 2020 may include a modem, a network interface (e.g., an Ethernet card), a communications port, etc. Software and/or data transferred via the communications interface 2020 may be in the form of signals which may be electronic, electromagnetic, optical, and/or other signals capable of being received by the communications interface 2020. The signals may be provided to the communications interface 2020 via a communications path 2022. The communications path 2022 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2016 and 2018 or a hard disk installed in the hard disk drive 2010. The computer program products may be means for providing software to the computer system 2000. The computer programs (which may also be called computer control logic) may be stored in the main memory 2006 and/or the secondary memory 2008. The computer programs may be received via the communications interface 2020. Such computer programs, when executed, may enable the computer system 2000 to implement the present disclosure as discussed herein. In particular, the computer programs, when executed, may enable the processor 2004 to implement the processes of the present disclosure, such as any of the methods described herein. Accordingly, such computer programs may represent controllers of the computer system 2000.

Figure 21:
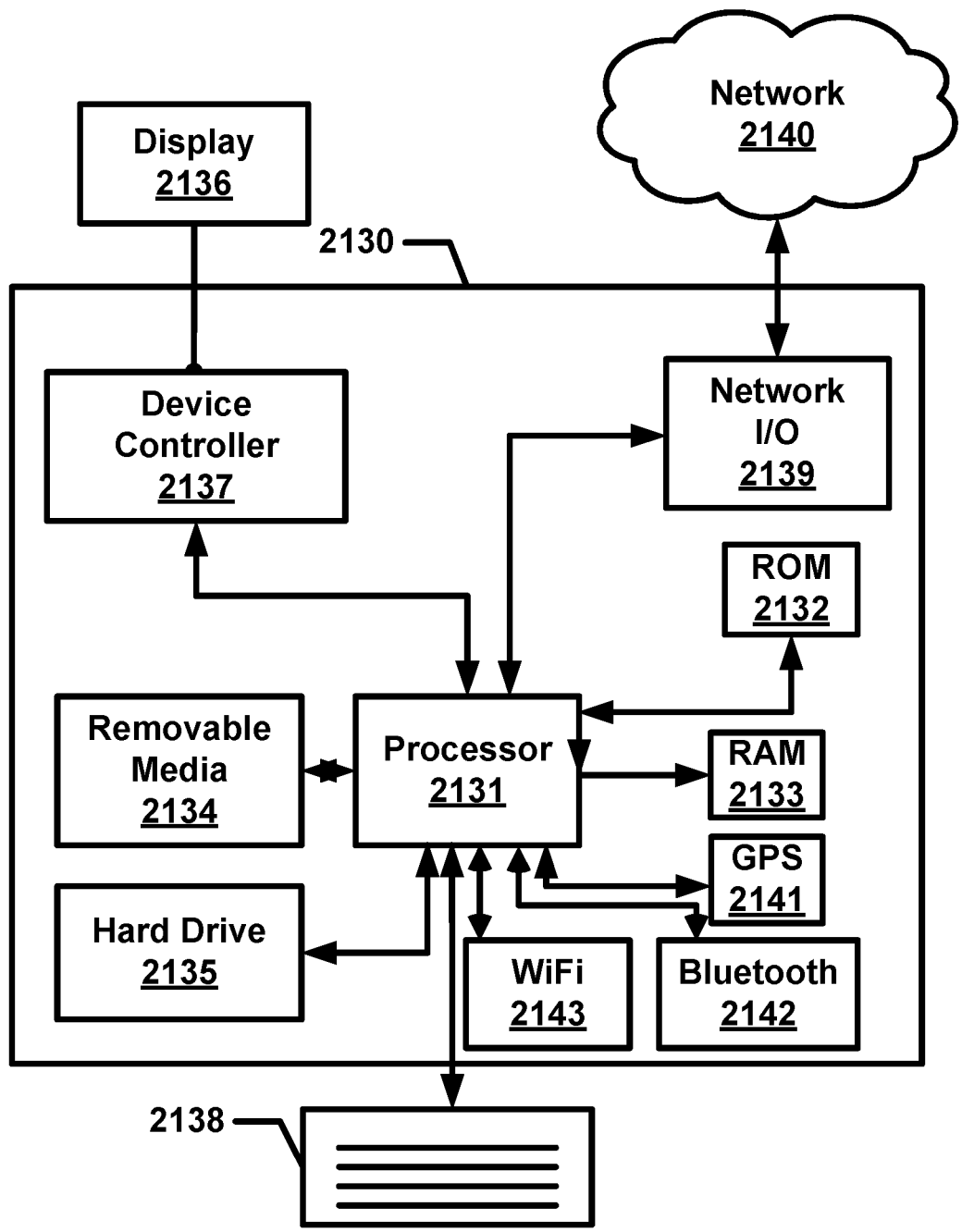
FIG. 21 shows example elements of a computing device that may be used to implement any of the various devices described herein.

FIG. 21 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2130 may include one or more processors 2131, which may execute instructions stored in the random-access memory (RAM) 2133, the removable media 2134 (such as a Universal Serial Bus (USB) drive, compact disk (CD) or digital versatile disk (DVD), or floppy disk drive), or any other desired storage medium. Instructions may also be stored in an attached (or internal) hard drive 2135. The computing device 2130 may also include a security processor (not shown), which may execute instructions of one or more computer programs to monitor the processes executing on the processor 2131 and any process that requests access to any hardware and/or software components of the computing device 2130 (e.g., ROM 2132, RAM 2133, the removable media 2134, the hard drive 2135, the device controller 2137, a network interface 2139, a GPS 2141, a Bluetooth interface 2142, a WiFi interface 2143, etc.). The computing device 2130 may include one or more output devices, such as the display 2136 (e.g., a screen, a display device, a monitor, a television, etc.), and may include one or more output device controllers 2137, such as a video processor. There may also be one or more user input devices 2138, such as a remote control, keyboard, mouse, touch screen, microphone, etc. The computing device 2130 may also include one or more network interfaces, such as a network interface 2139, which may be a wired interface, a wireless interface, or a combination of the two. The network interface 2139 may provide an interface for the computing device 2130 to communicate with a network 2140 (e.g., a RAN, or any other network). The network interface 2139 may include a modem (e.g., a cable modem), and the external network 2140 may include communication links, an external network, an in-home network, a provider's wireless, coaxial, fiber, or hybrid fiber/coaxial distribution system (e.g., a DOCSIS network), or any other desired network. Additionally, the computing device 2130 may include a location-detecting device, such as a global positioning system (GPS) microprocessor 2141, which may be configured to receive and process global positioning signals and determine, with possible assistance from an external server and antenna, a geographic position of the computing device 2130.

The example in FIG. 21 may be a hardware configuration, although the components shown may be implemented as software as well. Modifications may be made to add, remove, combine, divide, etc. components of the computing device 2130 as desired. Additionally, the components may be implemented using basic computing devices and components, and the same components (e.g., processor 2131, ROM storage 2132, display 2136, etc.) may be used to implement any of the other computing devices and components described herein. For example, the various components described herein may be implemented using computing devices having components such as a processor executing computer-executable instructions stored on a computer-readable medium, as shown in FIG. 21. Some or all of the entities described herein may be software based, and may co-exist in a common physical platform (e.g., a requesting entity may be a separate software process and program from a dependent entity, both of which may be executed as software on a common computing device).

FIG. 22 shows example test results 2200 associated with the disclosures herein. The example test results 2200 demonstrate that the disclosures herein may achieve increased gains with faster encoding and/or decoding. The example test results 2200 shown in FIG. 22 were obtained using Common Test Conditions (CTCs) for contributions to the Joint Video Exploration Team (JVET). The CTCs used to obtain the example results in FIG. 22 identify eight video sequences grouped into two classes, Class F and Class TGM (text and graphics with motion), according to the type of content in the video sequences. The Class A sequences used included one camera-capture video sequence, one video gaming video sequence, and two screen content sequences, using spatial high-definition (HD) resolutions of 720p and 1080p. The four Class TGM sequences used included screen-capture content from a computer screen containing high-textured images and motion graphics at 1080p resolution. Encoder performance may be evaluated using a metric that may be referred to as the Bjontegaard Delta Bitrate (BD-Rate), which indicates the percentage of the bit rate that can be achieved by introducing video encoding/decoding technique into a video encoder/decoder reference model ECM (Enhanced Compression Model) while maintaining the same quality as measured by objective metrics. The BD-Rate may be reported for the three independent components of a video sequence, for example, the luminance component (Y) and two chroma components (U and V). A negative (e.g., less than zero) value of the BD-Rate may indicate that the bit rate of the encoded bitstream is reduced compared to the bit rate of the ECM model. Consequently, where a negative BD-Rate value is obtained or otherwise observed, the proposed video encoding/decoding technique may be deemed to be more efficient than the ECM model due to acquired gain. New versions of an encoder/decoder model may be periodically released, by JVET for example, that include the video encoding/decoding techniques that have been accepted as part of a hypothetical future standard. The example test results 2200 shown in FIG. 2200 were reported for ECM version 5.0 and ECM version 6.0.

A computing device may perform a method comprising multiple operations. A first block vector predictor (BVP) candidate group may be determined. The first BVP candidate group may comprise at least one BVP candidate, of a plurality of BVP candidates, that are within a threshold distance from a first BVP candidate of the plurality of BVP candidates. The first BVP candidate group may comprise each BVP candidate, of the plurality of BVP candidates, that are within the threshold distance from the first BVP candidate. A second BVP candidate group may be determined. The second BVP candidate group may comprise one or more BVP candidates, of the plurality of BVP candidates, that are not within the threshold distance from the first BVP candidate. A first cost may be determined for a BVP candidate of the first BVP candidate group. A second cost may be determined for a BVP candidate of the second BVP candidate group. A list of BVP candidates may be generated. The list of BVP candidates may comprise a first BVP candidate selected from the first BVP candidate group based on the first cost. The list of BVP candidates may comprise a second BVP candidate selected from the second BVP candidate group based on the second costs. A BVP candidate of the plurality of BVP candidates may indicate a displacement from a current block (CB) to a location in a reconstructed region of a picture. The one or more BVP candidates of the second BVP candidate group may be within a second threshold distance from a second BVP candidate of the plurality of BVP candidates. A third BVP candidate group comprising one or more BVP candidates of the plurality of BVP candidates not included in the first BVP candidate group and not included in the second BVP candidate group may be determined. The first cost may comprise a first template matching (TM) cost. The first TM cost may indicate a first difference between a template of a current block (CB) and a template of a first prediction block (PB) displaced from the CB by a BVP candidate of the first BVP candidate group. The second cost may comprise a second TM cost. The second TM cost may indicate a first difference between the template of the CB and a template of a second PB displaced from the CB by a BVP candidate of the second BVP candidate group. At least one of the first difference or the second difference may be a Sum of Absolute Differences (SAD). The first BVP candidate may be selected from the first BVP candidate group based on the first cost being a lowest cost of at least one cost determined respectively for the at least one BVP candidate of the first BVP candidate group. The second BVP candidate may be selected from the second BVP candidate group based on the second cost being a lowest cost of at least one cost determined respectively for the at least one BVP candidate of the second BVP candidate group. The list of BVP candidates may be reordered based on a cost determined respectively for a BVP candidate of the list of BVP candidates. A first averaged BVP candidate may be determined for the first BVP candidate group based on a first weighted average of one or more BVP candidates of the first BVP candidate group. The first weighted average may be based on at least one first template matching (TM) cost determined respectively for the at least one BVP candidate of the first BVP candidate group. A second averaged BVP candidate may be determined for the second BVP candidate group based on a second weighted average of one or more BVP candidates of the second BVP candidate group. The second weighted average may be based on at least one second TM cost determined respectively for the at least one BVP candidate of the second BVP candidate group. The first averaged BVP candidate and the second averaged BVP candidate may be included in the list of BVP candidates. The first weighted average may be based on an inverse of the first TM cost determined for a BVP candidate of the first BVP candidate group. The second weighted average may be based on an inverse of a second TM cost determined for a BVP candidate of the second BVP candidate group. The list of BVP candidates may be a merge list for merge mode. The list of BVP candidates may be an advanced motion vector prediction (AMVP) list for AMVP mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a current block based on a BVP candidate indicated in the list of BVP candidates. A computer-readable medium may store instructions that, when executed, cause performance of the described method, additional operations and/or include the additional elements.

A computing device may perform a method comprising multiple operations. A first block vector predictor (BVP) candidate group may be determined. The first BVP candidate group may comprise at least one BVP candidate, of a plurality of BVP candidates, having an endpoint that is located a first distance away from an endpoint of a first BVP candidate. The first BVP candidate group may comprise each BVP candidate, of the plurality of BVP candidates, having an endpoint that is located the first distance away from the end point of the first BVP candidate. The first distance may be less than or equal to a threshold distance. A second BVP candidate group may be determined. The second BVP candidate group may comprise at least one BVP candidate, of the plurality of BVP candidates, having an endpoint located a second distance away from an endpoint of a second BVP candidate. The second BVP candidate group may comprise each BVP candidate, of the plurality of BVP candidates, having an endpoint located the second distance away from the endpoint of the second BVP candidate. The second distance may be less than or equal to the threshold distance. A first BVP candidate may be selected from the first BVP candidate group. The first BVP candidate may be selected based on a cost determined for the first BVP candidate being a lowest cost of at least one cost determined respectively for the at least one BVP candidate of the first BVP candidate group. A second BVP candidate may be selected from the second BVP candidate group. The second BVP candidate may be selected based on a cost determined for the second BVP candidate being a lowest cost of at least one cost determined respectively for the at least one BVP candidate of the second BVP candidate group. A list of BVP candidates may be generated. The list of BVP candidates may comprise the first BVP candidate and the second BVP candidate. The first distance may be a Euclidian (L2) distance between the endpoint of the first BVP candidate and an endpoint of a BVP candidate of the first BVP candidate group. The second distance may be an L2 distance between the endpoint of the second BVP candidate and an endpoint of a BVP candidate of the second BVP candidate group. The threshold distance may correspond to a ratio between an area of a current block and a size of a prediction unit. The threshold distance may comprise ⅛, ¼, ½, 1, 2, 3, 4, 5, 6, 7, 8, 12, 16, 20, 24, 28, 32, 36, 40, 44, 48, 52, 56, 60, and or 64. The list of BVP candidates may be a merge list for merge mode. The list of BVP candidates may be an advanced motion vector prediction (AMVP) list for AMVP mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a current block based on a BVP candidate indicated in the list of BVP candidates. A computer-readable medium may store instructions that, when executed, cause performance of the described method, additional operations and/or include the additional elements.

A computing device may perform a method comprising multiple operations. A plurality of block vector predictor (BVP) candidates may be determined for a current block of a picture. The plurality of BVP candidates may comprise a first BVP candidate and a second BVP candidate. The BVP candidate, of the first BVP candidate and the second BVP candidate, that is associated with a lowest template matching cost may be determined. The BVP candidate associated with the lowest template matching cost may be determined based on a distance between a first endpoint of the first BVP candidate and a second endpoint of the second BVP candidate being within a threshold distance. The BVP candidate that is associated with the lowest template matching cost may be included in a merge list for merge mode or an advanced motion vector prediction (AMVP) list for AMVP mode. A template matching cost associated with a third BVP candidate may be determined. The template matching cost for the third BVP candidate may be determined based on a second distance between the first endpoint of the first BVP candidate and a third endpoint of a third BVP candidate of the plurality of BVP candidates being within the threshold distance. The template matching cost associated with the third BVP candidate may be compared with a template matching cost associated with the first BVP candidate. A template matching cost may be determined for a BVP candidate of the plurality of BVP candidates. The template matching cost may indicate a difference between a template of a current block (CB) and a template of a prediction block (PB) that is displaced from the CB by the BVP candidate. An ordering of the plurality of BVP candidates may be determined. The ordering of the plurality of BVP candidates may be determined based on a plurality of BVP candidate types. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode a current block based on the BVP candidate that is associated with the lowest template matching cost. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   determining, by a computing device, a first block vector predictor (BVP) candidate group comprising at least one BVP candidate, of a plurality of BVP candidates, within a threshold distance from a first BVP candidate of the plurality of BVP candidates;
   determining a second BVP candidate group comprising one or more BVP candidates, of the plurality of BVP candidates, not within the threshold distance from the first BVP candidate;
   determining, for a BVP candidate of the first BVP candidate group, a first cost;
   determining, for a BVP candidate of the second BVP candidate group, a second cost; and
   generating a list of BVP candidates comprising:
      a first BVP candidate selected from the first BVP candidate group based on the first cost; and
      a second BVP candidate selected from the second BVP candidate group based on the second cost.

2. The method of claim 1, wherein a BVP candidate of the plurality of BVP candidates indicates a displacement from a current block (CB) to a location in a reconstructed region of a picture.

3. The method of claim 1, wherein the one or more BVP candidates of the second BVP candidate group are within a second threshold distance from a second BVP candidate of the plurality of BVP candidates.

4. The method of claim 1, further comprising determining a third BVP candidate group comprising one or more BVP candidates of the plurality of BVP candidates not included in the first BVP candidate group and not included in the second BVP candidate group.

5. The method of claim 1, wherein:
   the first cost comprises a first template matching (TM) cost that indicates a first difference between a template of a current block (CB) and a template of a first prediction block (PB) displaced from the CB by a BVP candidate of the first BVP candidate group; and
   the second cost comprises a second TM cost that indicates a second difference between the template of the CB and a template of a second PB displaced from the CB by a BVP candidate of the second BVP candidate group.

6. The method of claim 5, wherein at least one of the first difference or the second difference is a Sum of Absolute Differences (SAD).

7. The method of claim 1, further comprising:
   selecting the first BVP candidate from the first BVP candidate group based on the first cost being a lowest cost of at least one cost determined respectively for the at least one BVP candidate of the first BVP candidate group; and
   selecting the second BVP candidate from the second BVP candidate group based on the second cost being a lowest cost of at least one cost determined respectively for the at least one BVP candidate of the second BVP candidate group.

8. The method of claim 1, further comprising reordering the list of BVP candidates based on a cost determined respectively for at least one BVP candidate of the list of BVP candidates.

9. The method of claim 1, further comprising:
   determining, for the first BVP candidate group and based on a first weighted average of one or more BVP candidates of the first BVP candidate group, a first averaged BVP candidate, wherein the first weighted average is based on at least one first template matching (TM) cost determined respectively for the at least one BVP candidate of the first BVP candidate group;
   determining, for the second BVP candidate group and based on a second weighted average of one or more BVP candidates of the second BVP candidate group, a second averaged BVP candidate, wherein the second weighted average is based on at least one second TM cost determined respectively for the at least one BVP candidate of the second BVP candidate group; and
   including, in the list of BVP candidates, the first averaged BVP candidate and the second averaged BVP candidate.

10. The method of claim 9, wherein:
    the first weighted average is based on an inverse of a first TM cost determined for a BVP candidate of the first BVP candidate group; and
    the second weighted average is based on an inverse of a second TM cost determined for a BVP candidate of the second BVP candidate group.

11. The method of claim 1, wherein the list of BVP candidates is one of:
    a merge list for merge mode; or
    an advanced motion vector prediction (AMVP) list for AMVP mode.

12. A method comprising:
    determining, by a computing device, a first block vector predictor (BVP) candidate group comprising at least one BVP candidate, of a plurality of BVP candidates, having an endpoint that is located a first distance away from an endpoint of a first BVP candidate, wherein the first distance is less than or equal to a threshold distance;

determining a second BVP candidate group comprising at least one BVP candidate, of the plurality of BVP candidates, having an endpoint located a second distance away from an endpoint of a second BVP candidate, wherein the second distance is less than or equal to the threshold distance;

selecting, from the first BVP candidate group, a first BVP candidate based on a cost determined for the first BVP candidate being a lowest cost of at least one cost determined respectively for the at least one BVP candidate of the first BVP candidate group;

selecting, from the second BVP candidate group, a second BVP candidate based on a cost determined for the second BVP candidate being a lowest cost of at least one cost determined respectively for the at least one BVP candidate of the second BVP candidate group; and generating a list of BVP candidates comprising the first BVP candidate and the second BVP candidate.

13. The method of claim 12, wherein:

the first distance is a Euclidian (L2) distance between the endpoint of the first BVP candidate and an endpoint of a BVP candidate of the first BVP candidate group; and the second distance is an L2 distance between the endpoint of the second BVP candidate and an endpoint of a BVP candidate of the second BVP candidate group.

14. The method of claim 1, wherein the threshold distance corresponds to a ratio between an area of a current block and a size of a prediction unit.

15. The method of claim 14, wherein the threshold distance comprises: ⅛, ¼, ½, 1, 2, 3, 4, 5, 6, 7, 8, 12, 16, 20, 24, 28, 32, 36, 40, 44, 48, 52, 56, 60, or 64.

16. The method of claim 12, wherein the list of BVP candidates is one of:
 a merge list for merge mode; or
 an advanced motion vector prediction (AMVP) list for AMVP mode.

17. A method comprising:
determining, by a computing device and for a current block of a picture, a plurality of block vector predictor (BVP) candidates comprising a first BVP candidate and a second BVP candidate;

determining, based on a distance between a first endpoint of the first BVP candidate and a second endpoint of the second BVP being within a threshold distance, which BVP candidate, of the first BVP and the second BVP candidate, is associated with a lowest template matching cost; and including, in a merge list for merge mode or an advanced motion vector prediction (AMVP) list for AMVP mode, the BVP candidate that is associated with the lowest template matching cost.

18. The method of claim 17, further comprising:
determining, based on a second distance between the first endpoint of the first BVP candidate and a third endpoint of a third BVP candidate of the plurality of BVP candidates being within the threshold distance, a template matching cost associated with the third BVP candidate; and comparing the template matching cost associated with the third BVP candidate with a template matching cost associated with the first BVP candidate.

19. The method of claim 17, further comprising determining, for a BVP candidate of the plurality of BVP candidates, a template matching cost that indicates a difference between a template of a current block (CB) and a template of a prediction block (PB) displaced from the CB by the BVP candidate.

20. The method of claim 17, further comprising ordering, based on a plurality of BVP candidate types, the plurality of BVP candidates.

* * * * *